(12) United States Patent
Amada

(10) Patent No.: US 11,856,173 B2
(45) Date of Patent: Dec. 26, 2023

(54) INFORMATION PROCESSING APPARATUS AND INFORMATION PROCESSING METHOD OF GIVING, TRANSFERRING AND RELEASING A USAGE RIGHT

(71) Applicant: Oki Electric Industry Co., Ltd., Tokyo (JP)

(72) Inventor: Daitetsu Amada, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 18/047,648

(22) Filed: Oct. 19, 2022

(65) Prior Publication Data

US 2023/0171362 A1 Jun. 1, 2023

(30) Foreign Application Priority Data

Nov. 29, 2021 (JP) .................................. 2021-193293

(51) Int. Cl.
*H04N 1/44* (2006.01)

(52) U.S. Cl.
CPC ..................... *H04N 1/4433* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2012/0167201 A1* | 6/2012 | Maeda | ................ | H04N 1/4433 726/17 |
| 2013/0239179 A1* | 9/2013 | Matsumura | .......... | H04N 1/4433 726/4 |
| 2015/0347739 A1* | 12/2015 | Matsushima | ........... | G06F 21/32 726/20 |
| 2016/0231686 A1* | 8/2016 | Itoh | ...................... | G03G 15/502 |
| 2016/0295052 A1* | 10/2016 | Tao | .................... | H04N 1/00859 |
| 2017/0208199 A1* | 7/2017 | Kawamura | ........ | H04N 1/00039 |
| 2019/0260889 A1* | 8/2019 | Kanematsu | ........ | H04N 1/00477 |
| 2019/0281177 A1* | 9/2019 | Yashima | ............ | H04N 1/00697 |

FOREIGN PATENT DOCUMENTS

JP 2021-29046 A 2/2021

* cited by examiner

*Primary Examiner* — Henok Shiferaw
(74) *Attorney, Agent, or Firm* — METROLEX IP LAW GROUP, PLLC

(57) ABSTRACT

An information processing method to be performed by an information processing apparatus according to an embodiment may include: causing an authentication processor to perform a login authentication based on an operation performed on an operation section; and causing an exclusive control executor that gives a usage right to use a function to the operation section after the operation section is authenticated by the login authentication and releases the usage right given to the operation section in a case where no response is received from the operation section for a predetermined time after the usage right is given to determine, based on a detection result by a status detector that detects a status of the information processing apparatus, whether or not to release the usage right given to the operation section after the predetermined time passes.

10 Claims, 11 Drawing Sheets

INFORMATION PROCESSING APPARATUS AND INFORMATION PROCESSING METHOD OF GIVING, TRANSFERRING AND RELEASING A USAGE RIGHT

CROSS REFERENCE TO RELATED APPLICATIONS

This application claims priority based on 35 USC 119 from prior Japanese Patent Application No. 2021-193293 filed on Nov. 29, 2021 entitled "INFORMATION PROCESSING APPARATUS AND INFORMATION PROCESSING METHOD", the entire contents of which are incorporated herein by reference.

BACKGROUND

The disclosure may relate to an information processing apparatus and an information processing method.

In a related art, an information processing apparatus such as a multi-function machine is equipped with multiple operating sections such as personal computers (PCs) and is configured to be operable by multiple operators (i.e., users) from multiple locations remote from each other. When the right to perform an operation is given to one user, this type of information processing apparatus performs exclusive control to restrict the operations by the other users.

In addition, the information processing apparatus that performs such exclusive control makes the following countermeasure against a situation where, when the one user forgets to release the right to perform an operation (specifically, the usage right to use a function subject to exclusive control), another user has to unnecessarily wait. Specifically, when the one user does not respond for a predetermined time, the information processing apparatus releases the usage right given to the one user and transfers the usage right to the other user (for example, see Patent Document 1).

Patent Document 1: Japanese Patent Application Publication No. 2021-29046

SUMMARY

However, for example, when the one user is engaged in work such as consumables replenishment or replacement, the one user cannot respond for the predetermined time. In this situation, the information processing apparatus in the related art releases the usage right given to the one user and transfers the usage right to the other user. In this case, there is a problem that the work efficiency decreases because the one user is not allowed to continuously use the function previously used after the one user completes the work such as the consumables replenishment or replacement.

An object of an embodiment of the disclosure is to provide an information processing apparatus and an information processing method capable of improving the work efficiency as compared with those in the related art.

A first aspect of the disclosure may be an information processing apparatus that may include: an authentication processor configured to perform a login authentication based on an operation performed on an operation section; an exclusive control executor configured to give a usage right to use a function to the operation section after the operation section is authenticated by the login authentication and release the usage right given to the operation section in a case where no response is received from the operation section for a predetermined time after the usage right is given; a function executor configured to execute the function based on an operation performed on the operation section when the usage right of the function is given to the operation section; and a status detector configured to detect a status of the information processing apparatus, wherein the exclusive control executor is configured to determine, based on a detection result by the status detector, whether or not to release the usage right given to the operation section after the predetermined time passes.

A second aspect of the disclosure may be an information processing method to be performed by an information processing apparatus. The information processing method may include: causing an authentication processor to perform a login authentication based on an operation performed on an operation section; and causing an exclusive control executor that gives a usage right to use a function to the operation section after the operation section is authenticated by the login authentication and releases the usage right given to the operation section in a case where no response is received from the operation section for a predetermined time after the usage right is given to determine, based on a detection result by a status detector that detects a status of the information processing apparatus, whether or not to release the usage right given to the operation section after the predetermined time passes.

According to at least one of the aspects described above, for example, in a case where the information processing apparatus is in a consumables replacing status, it is possible to keep the usage right given to the operation section from being released even when the predetermined time passes with no response received from the operation section. This makes it possible to avoid a situation where the usage right of a used function is released while a user is in the process of performing consumables replacement work, and thereby allows the user to continuously use the used function after the consumables replacement work is completed.

Thus, the information processing apparatus and the information processing method capable of improving work efficiency as compared with those in the related art can be achieved.

DETAILED DESCRIPTION

Figure 1:
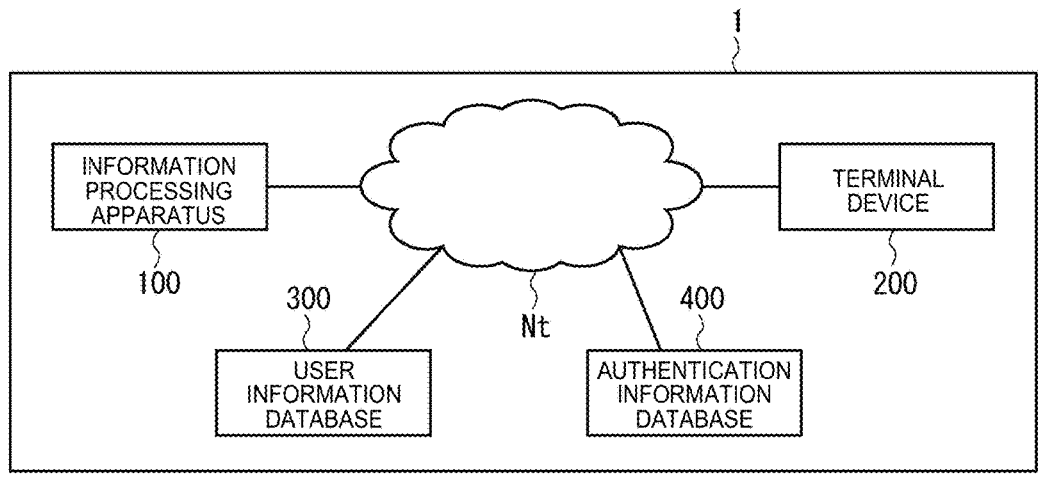
FIG. 1 is a diagram illustrating a configuration of an information processing system according to a first embodiment.

Descriptions are provided hereinbelow for one or more embodiments based on the drawings. In the respective drawings referenced herein, the same constituents are designated by the same reference numerals and duplicate explanation concerning the same constituents is omitted. All of the drawings are provided to illustrate the respective examples only.

1. First Embodiment (1-1. Configuration of Information Processing System)

FIG. 1 illustrates a configuration of an information processing system 1 according to a first embodiment. This information processing system 1 includes an information processing apparatus 100, a terminal device 200, a user information database 300, and an authentication information database 400 which can communicate with each other via a network Nt.

The information processing apparatus 100 is, for example, a multi-function machine. The terminal device 200 is a smartphone, PC, or the like, and is used as a section for remotely operating the information processing apparatus 100. Specifically, the information processing apparatus 100 can be directly operated by using an operation display panel provided as a direct operation section in the information processing apparatus 100, or be remotely operated by using the terminal device 200.

The information processing system 1 illustrated in FIG. 1 includes the single terminal device 200, but may include two or more terminal devices 200. In the case where two or more terminal devices 200 are provided, multiple users remotely operate the information processing apparatus 100 by using the respective terminal devices 200.

The user information database 300 is a database built on a server, for example. This user information database 300 stores information on users who are authorized to use the information processing apparatus 100 (referred to as user information). The user information contains, for example, a user name of each user and the like.

The authentication information database 400 is also a database built on a server, for example. This authentication information database 400 stores authentication information on each user registered in the user information database 300. The authentication information is information for a login to the information processing apparatus 100 and contains, for example, a user name, a user ID, and a password. The user information registered in the user information database 300 and the authentication information registered in the authentication information database 400 are associated with each other by the user name.

The network Nt is, for example, the Internet, a LAN, or the like and may be any network through which the apparatus and devices can communicate information. The network Nt may be a single network or be constructed by multiple networks and communication lines. The network Nt may be a wired network, a wireless network, or a mixed network of wired and wireless.

(1-2. Main Structure of Information Processing Apparatus)

Figure 2:
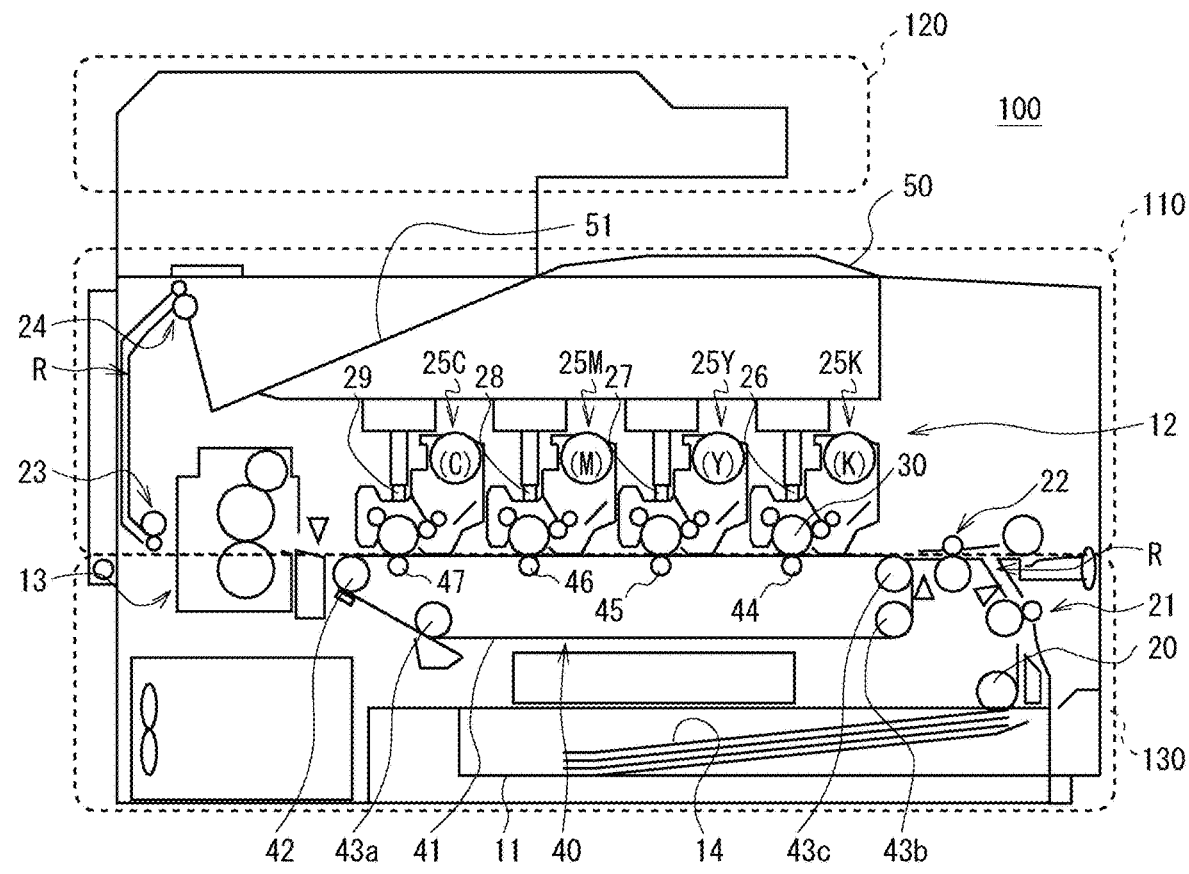
FIG. 2 is a diagram illustrating a main structure of the information processing apparatus according to a first embodiment.

Next, using FIG. 2, a main structure of the information processing apparatus 100 is described. Since the information processing apparatus 100 is, for example, the multi-function machine as described above, FIG. 2 illustrates a main structure as the multi-function machine. Specifically, the information processing apparatus 100 includes an image formation section 110, an image reading section 120, and a sheet transport section 130. The image formation section 110 is provided on top of the sheet transport section 130 and the image reading section 120 is provided on top of the image formation section 110.

The image formation section 110 includes an image formation mechanism 12 for forming color images. The image formation mechanism 12 has a structure as a color electrophotographic printer capable of making a print in, for example, four colors of black (K), yellow (Y), magenta (M), and cyan (C). The image formation mechanism 12 is described in detail later. The image reading section 120 includes a scanner device capable of reading documents as image data.

The sheet transport section 130 includes a sheet tray 11 and a fixing device 13, and further includes a sheet feed roller 20, a registration roller pair 21, transport roller pairs 22 and 23, and an ejection roller pair 24 for transporting a recording sheet 14 as a recording medium (that is, a print medium).

The sheet tray 11 stores therein recording sheets 14 in a stacked manner and is detachably attached to a lower portion in the sheet transport section 130. The sheet feed roller 20 picks up the recording sheets 14 stored in the sheet tray 11 one by one from the upper most sheet and feeds the recording sheet 14 to a sheet transport path R. The registration roller pair 21 and the transport roller pair 22 provided on the sheet transport path R correct a skew of the recording sheet 14 and transport the recording sheet 14 to the image formation mechanism 12 of the image formation section 110.

The image formation mechanism 12 includes four image formation units 25 (specifically image formation units 25K, 25Y, 25M, and 25C) arranged along the sheet transport path R in a detachably attached manner, four exposure heads 26, 27, 28, and 29 respectively provided in the four image formation units 25, and a transfer processor 40.

The four image formation units 25 have the same structure except that the image formation units 25 use different colors of toners. The four image formation units 25 and the four exposure heads 26, 27, 28, and 29 form images (toner images) developed with the toners by an electrophotographic process based on image data on photoreceptor drums 30 respectively provided to the four image formation units 25.

The transfer processor 40 includes a transfer belt 41 that electrostatically attracts and transports the recording sheet 14, a drive roller 42 that is rotated by a driving unit not illustrated to drive the transfer belt 41, tension rollers 43$a$, 43$b$, and 43$c$ around which the transfer belt 41 is stretched out in collaboration with the drive roller 42, and transfer rollers 44, 45, 46, and 47 arranged at positions opposed to the photoreceptor drums 30 of the respective image formation units 25 so as to be pressed against the photoreceptor drums 30 across the transfer belt 41. With application of a transfer voltage, the transfer rollers 44, 45, 46, and 47 transfer the toner images formed on the photoreceptor drums 30 of the respective image formation units 25 to the recording sheet 14.

The fixing device 13 heats and presses the recording sheet 14 on which the toner images are transferred by the transfer processor 40, thereby fixing the toner images onto the recording sheet 14. The recording sheet 14 on which the toner images are fixed is transported by the transport roller pair 23 provided on the sheet transport path R and ejected, by the ejection roller pair 24 provided on the sheet transport path R, onto a stacker 51 provided in a cover 50 forming an upper face portion of the image formation section 110. The main structure of the information processing apparatus 100 is as described above.

The information processing apparatus 100 implements a duplication function (copy), an image reading function (scan), and a printing function (print) by using the image formation section 110, the image reading section 120, and the sheet transport section 130 described above.

(1-3. System Configuration of Information Processing Apparatus)

Figure 3:
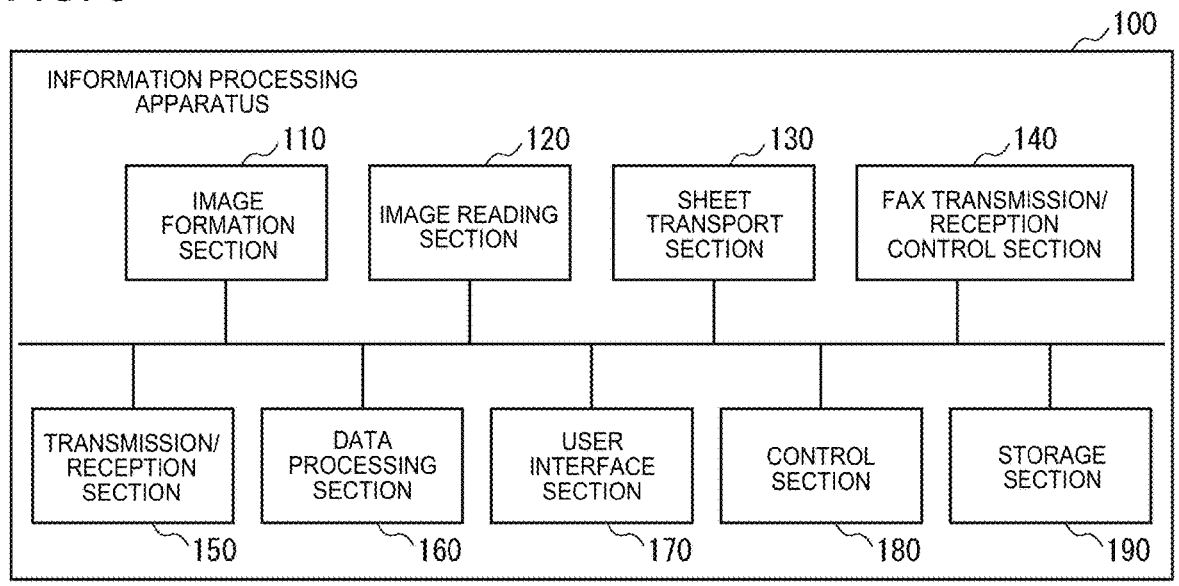
FIG. 3 is a diagram illustrating a system configuration of the information processing apparatus according to a first embodiment.

Next, using FIG. 3, a system configuration of the information processing apparatus 100 is described. The information processing apparatus 100 includes the image formation section 110, the image reading section 120, the sheet transport section 130, a fax transmission/reception control section 140, a transmission/reception section 150, a data processing section 160, a user interface section (hereinafter referred to as the UI section) 170, a control section 180, and a storage section 190.

As described above, the image formation section 110 forms an image (toner image) based on image data on a recording sheet 14. As described above, the image reading section 120 includes the scanner device, and optically reads a set document to generate image data. As described above, the sheet transport section 130 transports a recording sheet 14 picked up from the sheet tray 11 along the sheet transport path R and ejects the recording sheet 14 on which the image is formed by the image formation section 110 to the stacker 51.

The fax transmission/reception control section 140 is a section that implements a facsimile function of the information processing apparatus 100, and controls transmission/reception of image data via fax. The transmission/reception section 150 transmits and receives data to and from the external devices on the network Nt (such as the terminal device 200, the user information database 300, and the authentication information database 400).

The data processing section 160 is, for example, a software function section that a CPU (not illustrated) included in the information processing apparatus 100 implements by executing a program, and performs data processing on image data for the image formation section 110 to form an image on a recording sheet 14, image data read by the image reading section 120, and the like.

The UI section 170 is a section that functions as a display section that displays operation screens and an operation input section for a user to perform operation inputs, and includes, for example, an operation display panel. In other words, the UI section 170 acts as a direct operation section and the information processing apparatus 100 can be directly operated by using the UI section 170. Here, the information processing apparatus 100 can be directly operated by using the UI section 170 and also remotely operated by the terminal device 200. Here, the UI section 170 is referred to as a direct operation section whereas the terminal device 200 is referred to as a remote operation section. In the following descriptions, these direct operation section and remote operation section are also collectively referred to as the operation sections, in some cases.

The control section 180 is also a software function section as similar to the data processing section 160 and controls the image formation section 110, the image reading section 120, the sheet transport section 130, the fax transmission/reception control section 140, the transmission/reception section 150, and the UI section 170. Further, as described later in detail, the control section 180 manages usage right information indicating which operation section (the UI section 170 or the terminal device 200) holds the usage right of each of the functions included in the information processing apparatus 100 and performs exclusive control of some of the functions included in the information processing apparatus 100. Here, the exclusive control means control such that a function used by one of the operation sections (for example the UI section 170) is disabled from being used by another operation section (for example, the terminal device 200). Moreover, the information processing apparatus 100 performs exclusive control of only specific functions that cannot be used concurrently by multiple users.

The storage section 190 includes, for example, a ROM and a RAM. The ROM in the storage section 190 is, for example, a non-volatile memory and stores a program causing the CPU to function as the data processing section 160 and the control section 180 (in other words, the program to be executed by the CPU) and the like. The RAM is used as work areas in the data processing by the data processing section 160 and in the control by the control section 180. The system configuration of the information processing apparatus 100 is as described above.

(1-4. System Configuration of Terminal Device)

Figure 4:
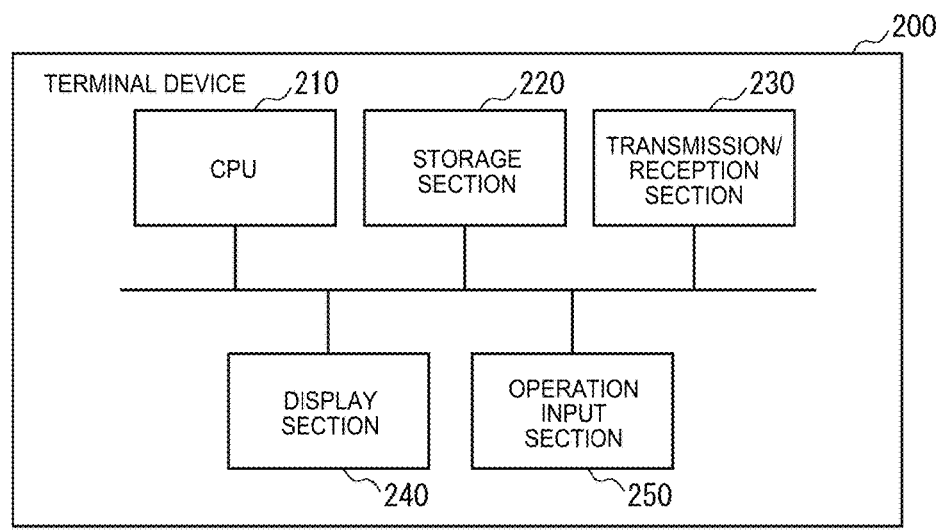
FIG. 4 is a diagram illustrating a system configuration of a terminal device according to a first embodiment.

Next, using FIG. 4, a system configuration of the terminal device 200 is described. The terminal device 200 is the smartphone, PC, or the like as described above, and includes a CPU 210, a storage section 220, a transmission/reception section 230, a display section 240, and an operation input section 250.

The CPU 210 executes a program to function as a control section that controls an arithmetic section that executes various arithmetic operations, the transmission/reception section 230, the display section 240, and the operation input section 250. The storage section 220 includes, for example, a ROM and a RAM. The ROM in the storage section 220 is, for example, a non-volatile memory and stores a program to be executed by the CPU 210 and other data. The RAM is used as a work area for the CPU 210.

The transmission/reception section 230 transmits and receives information to and from the external devices on the network Nt (such as the information processing apparatus 100). The display section 240 displays a remote operation screen for remotely operating the information processing apparatus 100. The operation input section 250 is a section on which the user performs operation inputs and includes, for example, a touch panel, a mouse and a keyboard, or the like. The system configuration of the terminal device 200 is as described above.

(1-5. Functional Configuration of Control Section of Information Processing Apparatus)

Figure 5:
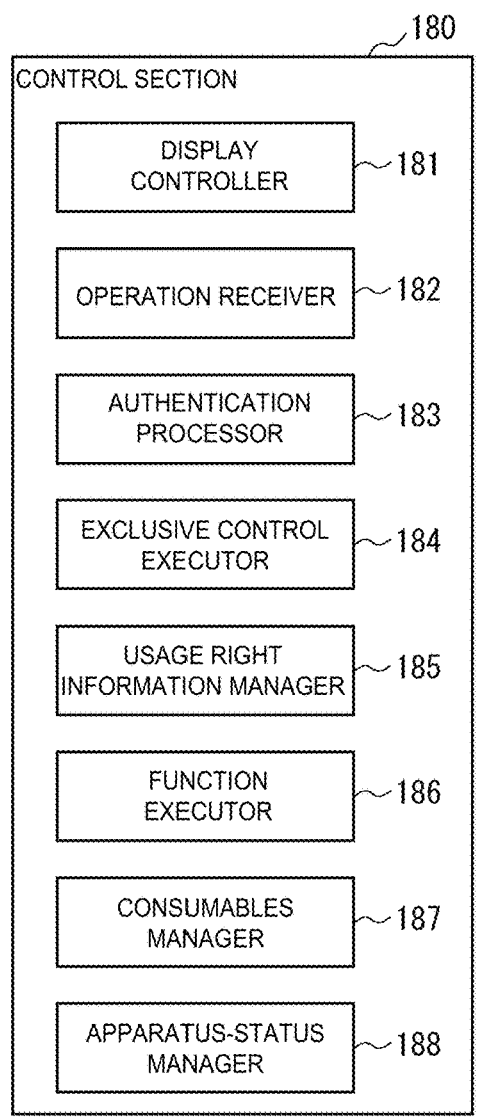
FIG. 5 is a diagram illustrating a functional configuration of a control section in the information processing apparatus according to a first embodiment.

Next, using FIG. 5, a functional configuration of the control section 180 in the information processing apparatus 100 is described. The control section 180 includes, as a functional configuration, a display controller 181, an operation receiver 182, an authentication processor 183, and an exclusive control executor 184, a usage right information manager 185, a function executor 186, a consumables manager 187, and an apparatus-status manager 188.

The display controller 181 generates data of an operation screen (direct operation screen) and causes the UI section 170 to display the operation screen based on this data. Specifically, the display controller 181 causes the UI section 170 to display operation screens which are, for example, a login screen and a menu screen for a user to select and use each of various functions (such as copy, scan, print, and fax) included in the information processing apparatus 100. As described in detail later, the display controller 181 also causes a screen display for transferring or acquiring the usage right of a function subject to exclusive control.

The operation receiver 182 receives an operation input performed on the operation screen by the user using the UI section 170. Specifically, for example, the operation receiver 182 receives operation inputs such as an input of authentication information for a login to the information processing apparatus 100, an operation screen switch instruction, an execution instruction for each of the various functions, and an input of setting information for each of the various functions. As described in detail later, the operation receiver 182 also receives an operation for transferring or acquiring the usage right of a function subject to exclusive control.

The authentication processor 183 performs authentication processing for a user based on the authentication information received by the operation receiver 182 (that is, the authentication information input by using the UI section 170) and determines whether or not to permit a login to the information processing apparatus 100. Specifically, when acquiring the authentication information via the operation receiver 182, the authentication processor 183 accesses the authentication information database 400, checks the user ID and the password contained in the authentication information, and permits a login when the user ID and the password are registered in the authentication information database 400 or rejects a login when the user ID and the password are not registered in the authentication information database 400. The authentication processor 183 also performs the authentication processing for a user based on the authentication information received from the terminal device 200 via the transmission/reception section 150 (that is, the authentication information input by using the terminal device 200) and determines whether or not to permit a login to the information processing apparatus 100.

The exclusive control executor 184 performs exclusive control of a specific function subject to exclusive control. Specifically, when the usage right of a specific function is given to one operation section (the UI section 170 or the terminal device 200), the exclusive control executor 184 performs control such that the other operation section (the terminal device 200 or the UI section 170) is disabled from using the specific function. In addition, in a case where, after the usage right of a specific function is given to, for example, the UI section 170, the terminal device 200 requests the usage right of the specific function via the transmission/reception section 230 and further the UI section 170 permits a transfer of the usage right of the specific function, the exclusive control executor 184 causes the usage right of the specific function to be transferred to the terminal device 200. In addition, in a case where, after the usage right of a specific function is given to, for example, the UI section 170, the UI section 170 leaves the specific function unattended without making any response for a predetermined time, the exclusive control executor 184 causes the usage right of the specific function to be automatically transferred to the terminal device 200 that requests the usage right of the specific function. The control by the exclusive control executor 184 is described in detail later.

Here, an operation section that holds a usage right is referred to as a holding-side operation section, whereas an operation section that requests a usage right is referred to as a requesting-side operation section. Then, a transfer of a usage right from a holding-side operation section to a requesting-side operation section is synonymous with releasing the usage right held by the holding-side operation section and giving the usage right to the requesting-side operation section.

The usage right information manager 185 manages usage right information specifying which operation section is given the usage right of each of functions subject to exclusive control based on instructions from the exclusive control executor 184. Specifically, for example, when the usage right of the duplication (copy) function to the UI section 170, the usage right information manager 185 manages, as the usage right information, information in which the information identifying the UI section 170, the user ID of the user logging in by using the UI section 170, and the information specifying the duplication function are associated with each other. Here, giving a usage right to an operation section is synonymous with giving the usage right to a user logging in by using the operation section.

The function executor 186 executes the various functions included in the information processing apparatus 100 based on instructions received by the operation receiver 182 and instructions received from the terminal device 200 via the transmission/reception section 150.

The consumables manager 187 manages the remaining amounts of consumables such as the recording sheets 14 stored in the sheet tray 11 and the toner stored in each image formation unit 25. When detecting, by using a sensor provided in the sheet tray 11 or each image formation unit 25, that consumables such as the recording sheets 14 or the toner have or has run out (that is, consumables replacement is needed), the consumables manager 187 notifies the exclusive control executor 184 that the consumables replacement is needed and consumables replacement work is to be performed. In addition, when detecting that the consumables replacement work is completed and the consumables are replenished (that is, the consumables replacement is not needed any more), the consumables manager 187 notifies the exclusive control executor 184 that the consumables replacement work is completed.

The apparatus-status manager 188 manages whether or not the consumables replacement work is underway as the status of the information processing apparatus 100. For example, when the recording sheets 14 in the sheet tray 11 run out, it is necessary to open the sheet tray 11 and replenish the recording sheets 14. For this reason, after the consumables manager 187 detects that consumables have run out, the apparatus-status manager 188 determines that the consumables replacement work is underway while the sheet tray 11 remains opened, and thereafter determines that the consumables replacement work is completed when the sheet tray 11 is closed.

For example, when the toner in any of the image formation units 25 runs out, it is necessary to open the cover 50 and replenish the toner. For this reason, the apparatus-status manager 188 determines that the consumables replacement work is underway while the cover 50 remains opened, and thereafter determines that the consumables replacement work is completed when the cover 50 is closed. When determining that the consumables replacement work is underway as described above, the apparatus-status manager 188 notifies the exclusive control executor 184 that the consumables replacement work is underway. Then, when determining that the consumables replacement work is completed, the apparatus-status manager 188 notifies the exclusive control executor 184 that the consumables replacement work is completed.

When receiving a notification that the consumables replacement work is underway from at least one of the consumables manager 187 and the apparatus-status manager 188, the exclusive control executor 184 prohibits the usage right from being transferred to the requesting-side operation section even though no response is received for the predetermined time from the holding-side operation section that holds the usage right. This is because, if the usage right is transferred to the requesting-side operation section (in other words, the usage right held by the holding-side operation section is released) while the user of the holding-side operation section is engaged in the consumables replacement work, the user of the holding-side operation section after the consumables replacement work is completed is disabled from automatically continuing using the function used before the replacement work.

Thereafter, when receiving the notifications that the consumables replacement work is completed from both of the consumables manager 187 and the apparatus-status manager 188, the exclusive control executor 184 cancels the status where a transfer of the usage right to the requesting-side operation section is prohibited. The functional configuration of the control section 180 in the information processing apparatus 100 is as described above.

(1-6. Functional Configuration of Terminal Device)

Figure 6:
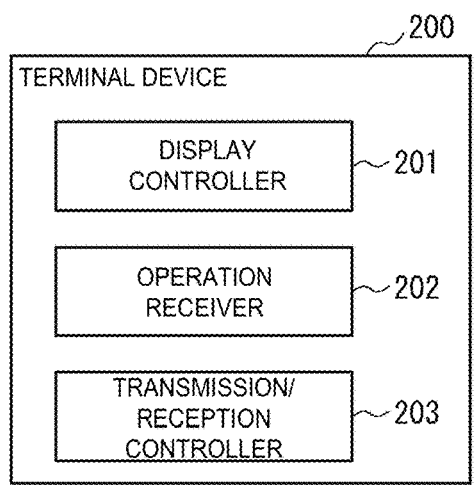
FIG. 6 is a diagram illustrating a functional configuration of the terminal device according to a first embodiment.

Next, using FIG. 6, a functional configuration of the terminal device 200 is described. The terminal device 200 includes, as a functional configuration, a display controller 201, an operation receiver 202, and a transmission/reception controller 203. Note that this functional configuration is a functional configuration of the CPU 210.

The display controller 201 generates remote operation screens based on operations received by the operation receiver 202 and information received by the transmission/reception section 230 from the information processing apparatus 100 and causes the display section 240 to display the remote operation screens. Here, the display controller 201 causes the display section 240 to display a login screen and menu screens as the remote operation screens such that the same operations as on the UI section 170 of the information processing apparatus 100 can be also performed on the terminal device 200. As described in detail later, the display controller 201 also causes a screen display for transferring or acquiring the usage right of a function subject to exclusive control based on information received by the transmission/reception section 230 from the information processing apparatus 100.

The operation receiver 202 receives an operation input performed on the remote operation screen by the user using the operation input section 250. Specifically, for example, the operation receiver 202 receives operation inputs such as an input of authentication information for a login to the information processing apparatus 100, a remote operation screen switch instruction, an execution instruction for each of the various functions, and an input of setting information of each of the various functions. As described in detail later, the operation receiver 202 also receives an operation for transferring or acquiring the usage right of a function subject to exclusive control.

The transmission/reception controller 203 controls the transmission/reception section 230 to transmit information (such as the authentication information, the execution instruction of each of the various functions, or the setting information of each of the various functions) based on an operation received by the operation receiver 202. Specifically, the transmission/reception controller 203 transmits, for example, the authentication information received by the operation receiver 202 to the information processing apparatus 100, thereby causing the authentication processor 183 of the information processing apparatus 100 to execute the authentication processing and receiving the authentication result. In addition, the transmission/reception controller 203 receives the usage right information from the information processing apparatus 100 and transmits the usage right information to the display controller 201. The display controller 201 provides a display based on the usage right information. Specifically, based on the usage right information, the display controller 201 displays a menu screen on which functions available and functions unavailable to the terminal device 200 are distinguishable from each other. The functional configuration of the terminal device 200 is as described above.

(1-7. Operations of Information Processing Apparatus) (1-7-1. Structures of Operation Screens)

Next, operations of the information processing apparatus 100 are described. As an operation of the information processing apparatus 100, first, structures of operation screens displayed on the UI section 170 in the information processing apparatus 100 are described. In the present embodiment, the direct operation screen displayed on the UI section 170 in the information processing apparatus 100 and the remote operation screen displayed on the display section 240 in the terminal device 200 have the same basic structures, and the same operations can be performed in the information processing apparatus 100 and the terminal device 200. However, in some cases, the direct operation screen of the information processing apparatus 100 and the remote operation screen of the terminal device 200 are not completely the same, and, for example, a function displayed in an available status on the direct operation screen of the information processing apparatus 100 is displayed in an unavailable status on the remote operation screen of the terminal device 200. In addition, as long as the same operations can be performed, the direct operation screen of the information processing apparatus 100 and the remote operation screen of the terminal device 200 may have partially different structures.

Figure 7:
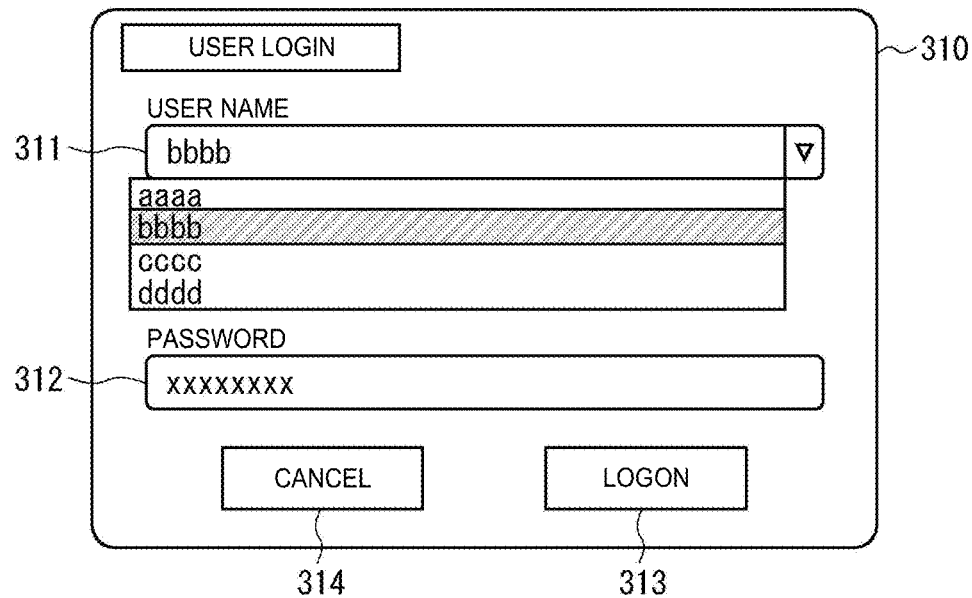
FIG. 7 is a diagram illustrating a structure of a login screen according to a first embodiment.

FIG. 7 illustrates a login screen 310 that is one of the operation screens. On this login screen 310, objects for inputting the authentication information (the user name and the password) for a login to the information processing apparatus 100 are displayed. Specifically, on the login screen 310, a user name list 311 for selecting the user name of a user who desires to log in and a password input form 312 for inputting a password are displayed. In addition, on the login screen 310, a login button 313 for a login (also referred to as a logon) based on the input authentication information and a cancel button 314 for canceling a login are displayed.

In the user name list 311, the user names of users who are authorized to log into and operate the information processing apparatus 100 are displayed. The user names contained in the user name list 311 are user names registered in the user information database 300 or the authentication information database 400.

A user selects his/her own user name from the user name list 311 by using the UI section 170 (or the operation input section 250 in the terminal device 200), inputs a password registered in association with this user name into the password input form 312, and presses the login button 313 to log into the information processing apparatus 100. Alternatively, the login method to the information processing apparatus 100 is not limited to an input of the authentication information on such a screen but may be, for example, a method in which an IC card storing user's authentication information is read by a not-illustrated card reader provided in the information processing apparatus 100. The structure of the login screen 310 is as described above.

Figure 8:
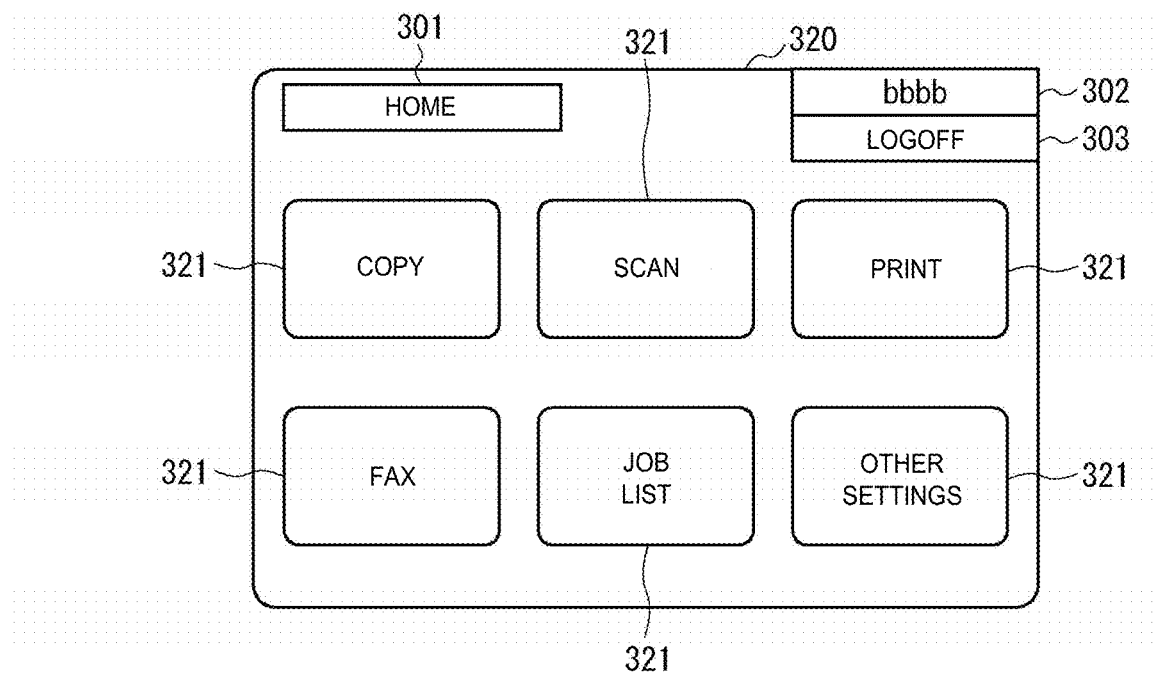
FIG. 8 is a diagram illustrating a structure of a home menu screen according to a first embodiment.

Then, FIG. 8 illustrates a home menu screen 320 that is one of the operation screens. On this home menu screen 320, objects are displayed which enable a user to use the functions in the information processing apparatus 100. Specifically, on the home menu screen 320, multiple function buttons 321, a screen information field 301, an operator information field 302, and a logoff button 303 for a logoff are displayed.

The function buttons 321 are buttons each of which is for displaying an operation screen for using the corresponding one of the functions in the information processing apparatus 100 or various kinds of information. In the example illustrated in FIG. 8, a total of six function buttons 321 named "copy", "scan", "print", "fax", "job list", and "other settings" are displayed. The "copy" function button 321 is a button for displaying an operation screen for using the duplication function, the "scan" function button 321 is a button for displaying an operation screen for using the image reading function, the "print" function button 321 is a button for displaying an operation screen for using the printing function, and the "fax" function button 321 is a button for displaying an operation screen for using the facsimile function.

The "job list" function button 321 is a button for displaying a list of jobs executed in the past (such as print jobs). The "other settings" function button 321 is a button for displaying function buttons 321 that cannot be displayed at once on the home menu screen 320.

In the screen information field 301, the type of the menu screen currently displayed is displayed. In the example illustrated in FIG. 8, letters "home" are displayed because the currently displayed menu screen is the home menu screen 320. In the operator information field 302, the user name of a login operator (i.e., user) is displayed. In the example illustrated in FIG. 8, "bbbb" is displayed as the user name of the login operator. The structure of the home menu screen 320 is as described above.

Figure 9:
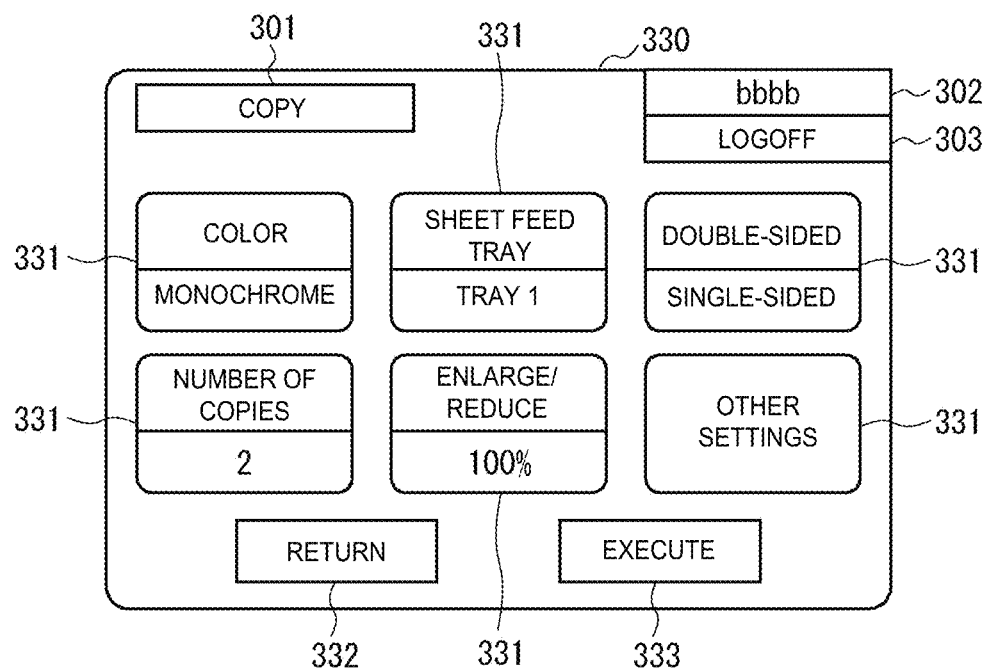
FIG. 9 is a diagram illustrating a structure of a copy menu screen according to a first embodiment.

Subsequently, FIG. 9 illustrates a copy menu screen 330 that is one of the operation screens. This copy menu screen 330 is a function menu screen displayed by switching from the home menu screen 320 when the "copy" function button 321 displayed on the home menu screen 320 is pressed.

On this copy menu screen 330, objects related to the duplication function are displayed. Specifically, on the copy menu screen 330, multiple setting buttons 331 for making various settings of the duplication function, a return button 332 for returning to the home menu screen 320, and an execution button 333 for executing the duplication function are displayed.

In the example illustrated in FIG. 9, a total of six setting buttons 331 named "color", "sheet feed tray", "double-sided", "number of copies", "enlarge/reduce", and "other settings" are displayed. The "color" setting button 331 is a button for selecting whether to duplicate in monochrome printing or in color printing, the "sheet feed tray" setting button 331 is a button for selecting a sheet feed tray, and the "double-sided" setting button 331 is a button for selecting whether to duplicate in single-sided printing or in double-sided printing.

The "number of copies" setting button 331 is a button for specifying the number of copies to be printed in duplication, the "enlarge/reduce" setting button 331 is a button for specifying the enlargement/reduction magnification of the image to be duplicated, and the "other settings" setting button 331 is a button for displaying the setting buttons 331 that cannot be displayed at once on the copy menu screen 330.

Also on the copy menu screen 330, the screen information field 301, the operator information field 302, and the logoff button 303 are displayed as in the home menu screen 320. In the screen information field 301 on the copy menu screen 330, letters "copy" are displayed because the currently displayed menu screen is the copy menu screen 330. In the operator information field 302, the user name of a login operator (i.e., user) is displayed. In the example illustrated in FIG. 9, "bbbb" is displayed as the user name of the login operator. The structure of the copy menu screen 330 is as described above.

The copy menu screen 330 displayed when the "copy" function button 321 on the home menu screen 320 is pressed is described herein as an example. Similarly, a scan menu screen not illustrated is displayed when the "scan" function button 321 on the home menu screen 320 is pressed and a fax menu screen not illustrated is displayed when the "fax" function button 321 on the home menu screen 320 is pressed. On each of the function menu screens other than the copy menu screen 330, setting buttons, the return button, the execute button, the screen information field 301, the operator information field 302, and the logoff button 303 are displayed as in the copy menu screen 330.

(1-7-2 Reception of Operations by Multiple Operation Sections)

Next, as an operation of the information processing apparatus 100, reception of operations by multiple operation sections is described. As described above, the information processing apparatus 100 receives a remote operation by the terminal device 200 in addition to an operation by the UI section 170. For this reason, there is a case where multiple operation sections, such as the UI section 170 and the terminal device 200 or the UI section 170 and multiple terminal devices 200, almost concurrently perform operations on the information processing apparatus 100.

Here, for example, in the case of an operation for displaying the home menu screen 320 or an operation for displaying the job list, the information processing apparatus 100 can handle the operations even if these operations are performed concurrently by multiple operation sections. Therefore, the information processing apparatus 100 permits the concurrent execution of these operations by multiple operation sections.

On the other hand, some of the functions in the information processing apparatus 100 cannot be operated concurrently (in other words, used concurrently) by multiple operation sections. For example, if multiple operating sections concurrently make different settings or execution instructions for the duplication (copy) function, the information processing apparatus 100 cannot handle them. Therefore, when one operation section performs an operation for the duplication function such as settings or an execution instruction, the information processing apparatus 100 restricts the operation such as settings or an execution instruction by another operation section. More specifically, when the usage right of the duplication function is given to one operation section, the exclusive control executor 184 of the information processing apparatus 100 does not give the usage right of the duplication function to another operation section, thereby imposing a restriction disabling the other operation section from using the duplication function.

The duplication function also uses the image formation section 110 and the sheet transport section 130 in addition to the image reading section 120. For this reason, when restricting the operation for the duplication function (in other words, when restricting the use of the duplication function), the exclusive control executor 184 of the information processing apparatus 100 also restricts the operations for the image reading (scan) function using the image reading section 120, and the printing (print) function and the facsimile (fax) function using the image formation section 110 and the sheet transport section 130.

Figure 10:
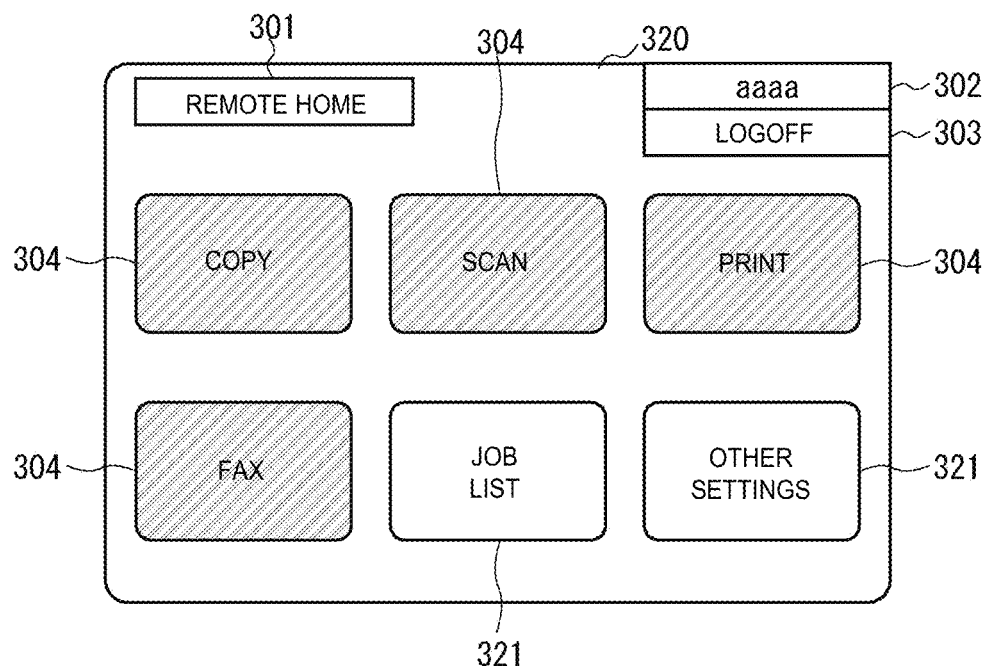
FIG. 10 is a diagram illustrating a structure of a home menu screen displayed on the terminal device according to a first embodiment.

Here, using FIGS. 9 and 10, descriptions are given of an operation screen in a case where multiple operation sections concurrently perform operations for the information processing apparatus 100. As described above, FIG. 9 is the copy menu screen 330 and is a direct operation screen displayed after the user "bbbb" logs in by using the UI section 170 serving as the operation section and then presses the "copy" function button 321 on the home menu screen 320.

On the other hand, FIG. 10 is the home menu screen 320 and is a remote operation screen displayed after a user "aaaa" logs in by using the terminal device 200 serving as the operation section. On the home menu screen 320 illustrated in FIG. 10, letters "remote home" are displayed in the screen information field 301 because the menu screen currently displayed is the home menu screen 320 serving as the remote operation screen.

As seen from the copy menu screen 330 illustrated in FIG. 9 and the home menu screen 320 illustrated in FIG. 10, the operation screen of each of the operation sections does not display information on the other operation section that is operating currently when the information processing apparatus 100 is operating currently by multiple operation sections. For example, the information on the user "aaaa" is not displayed on the copy menu screen 330 being operated by the user "bbbb".

At this moment, the user "bbbb" is operating the copy menu screen 330 by using the UI section 170 and therefore the information processing apparatus 100 restricts the duplication function, the image reading function, the printing function, and the facsimile function by any operation section other than the UI section 170. Thus, the home menu screen 320 being operated by the user "aaaa" displays "copy", "scan", "print", and "fax" unavailable buttons 304 instead of the "copy", "scan", "print", and "fax" function buttons 321 and disables the duplication function, the image reading function, the printing function, and the facsimile function from being used.

In this way, when the usage right of a function subject to exclusive control is given to one operation section (for example, the UI section 170), the information processing apparatus 100 does not give the usage right of the function to another operation section, thereby imposing the restriction disabling any other operation section (for example, the terminal device 200) from using the function.

Here, the display controller 181 of the information processing apparatus 100 and the display controller 201 of the terminal device 200 are configured to acquire the usage right information from the usage right information manager 185 of the information processing apparatus 100 and display the operation screens illustrated in FIGS. 9 and 10 based on the contents in the acquired usage right information (specifically, which operation section the usage right of each function is given to).

(1-7-3. Exclusive Control)

Next, as an operation of the information processing apparatus 100, exclusive control is described in detail. Note that the exclusive control described below is executed by the exclusive control executor 184 of the information processing apparatus 100 in collaboration with the UI section 170, the terminal device 200, and the like. In the case of exclusive control, if the operation on a function (that is, the use of the function) is continuously restricted to only one operation section, a problem may occur. For example, if an operator (user) who is operating one operation section to which the usage right of a function is given forgets to release the usage right of the function, an operator who desires to operate the function by using another operation section has to wait unnecessarily.

To address this, the information processing apparatus 100 is configured to enable the other operation section (that is, the requesting-side operation section) to perform an operation of requesting a transfer of the usage right from the one operation section (that is, the holding-side operation section) holding the usage right of the function.

As a specific operation example, considered is a case where, in a state where the copy menu screen 330 illustrated in FIG. 9 is displayed on the holding-side operation section (for example, the UI section 170 operated by the user "bbbb") and the home menu screen 320 illustrated in FIG. 10 is displayed on the requesting-side operation section (for example, the terminal device 200 operated by the user "aaaa"), the "copy" unavailable button 304 is pressed on the home menu screen 320 illustrated in FIG. 10.

Even if the "copy" unavailable button 304 is pressed on the home menu screen 320 by using the requesting-side operation section, the home menu screen 320 is not immediately switched to the copy menu screen 330 because the usage right of the duplication function is held by the holding-side operation section. In this case, the requesting-side operation section requests the usage right of the duplication function from the holding-side operation section.

Here, the copy menu screen 330 displayed on the holding-side operation section is referred to as the holding-side operation screen 330 and the home menu screen 320 displayed on the requesting-side operation section is referred to as the requesting-side operation screen 320.

Figure 11A:
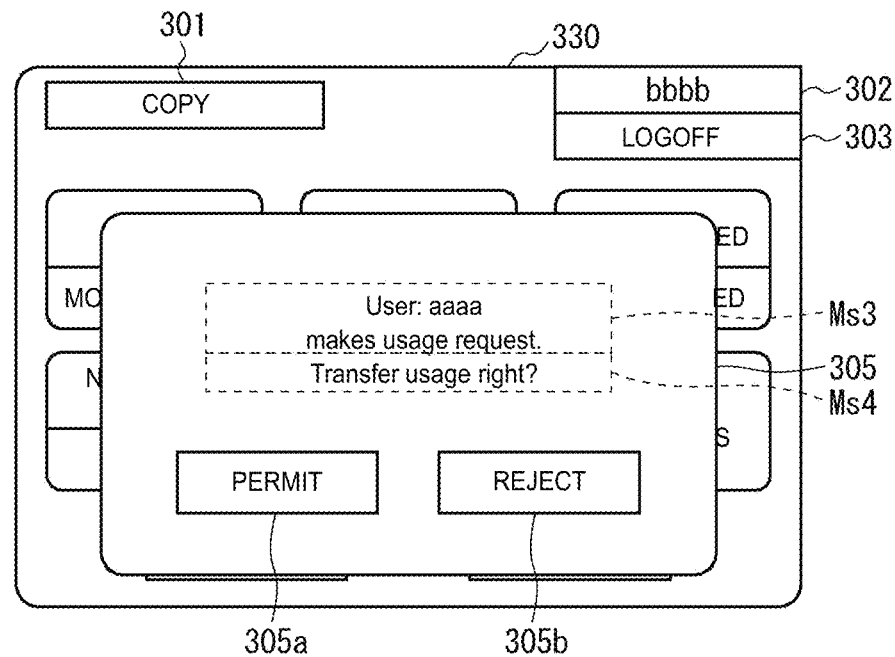
FIGS. 11A and 11B are diagrams illustrating display contents on a screen for requesting a usage right and a screen for transferring the usage right in response to the request according to a first embodiment.
Figure 11B:
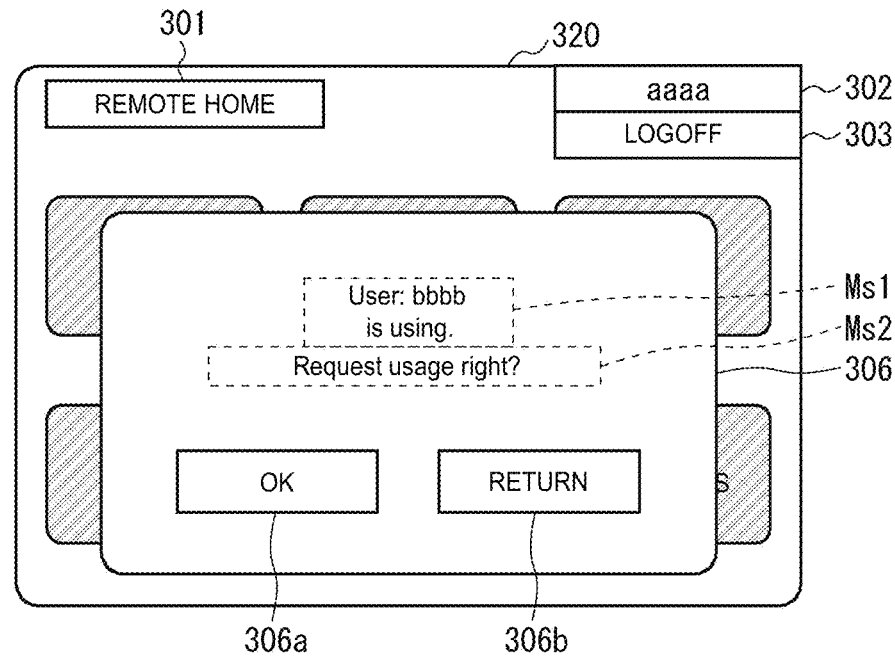

When the user "aaaa" presses the "copy" unavailable button 304 on the requesting-side operation screen 320 illustrated in FIG. 10, a dialog box 306 is displayed on the requesting-side operation screen 320 as illustrated in FIG. 11B, and the dialog box 306 is for requesting the usage right from the operation section (the UI section 170 operated by the user "bbbb") holding the usage right of the duplication function.

In this dialog box 306, a message ("User: bbbb is using") Ms1 indicating that another operator is using the duplication function, a message ("Request usage right?") Ms2 asking whether or not to request the usage right, an OK button 306*a* for choosing to request the usage right, and a return button 306*b* for closing the dialog box 306 without requesting the usage right are displayed.

In the case where the user "aaaa" presses the OK button 306*a*, the requesting-side operation section (for example, the terminal device 200) transmits a usage right request to the holding-side operation section (for example, the UI section 170).

In response to reception of the usage right request from the requesting-side operation section (the terminal device 200), the holding-side operation section (the UI section 170) causes a dialog box 305 for responding to the usage right request from the requesting-side operation section (the terminal device 200 operated by the user "aaaa") to be displayed on the holding-side operation screen 330 as illustrated in FIG. 11A.

In this dialog box 305, a message ("User: aaaa makes usage request") Ms3 indicating that another operator requests the usage right, a message ("Transfer usage right?") Ms4 asking whether or not to transfer the usage right, a permit button 305*a* for choosing to transfer the usage right, and a reject button 305*b* for choosing to reject the transfer of the usage right are displayed.

When the user "bbbb" operating the holding-side operation section (the UI section 170) presses the permit button 305*a*, the usage right is transferred from the holding-side operation section (the UI section 170) to the requesting-side operation section (the terminal device 200). In this case, the usage right information manager 185 of the information processing apparatus 100 updates the usage right information such that the operation section holding the usage right of the duplication function and the usage rights of the image reading function, the printing function, and the facsimile function is changed from the holding-side operation section (the UI section 170) to the requesting-side operation section (the terminal device 200). Thus, the usage rights of the duplication function, the image reading function, the printing function, and the facsimile function are transferred from the holding-side operation section to the requesting-side operation section.

Figure 12A:
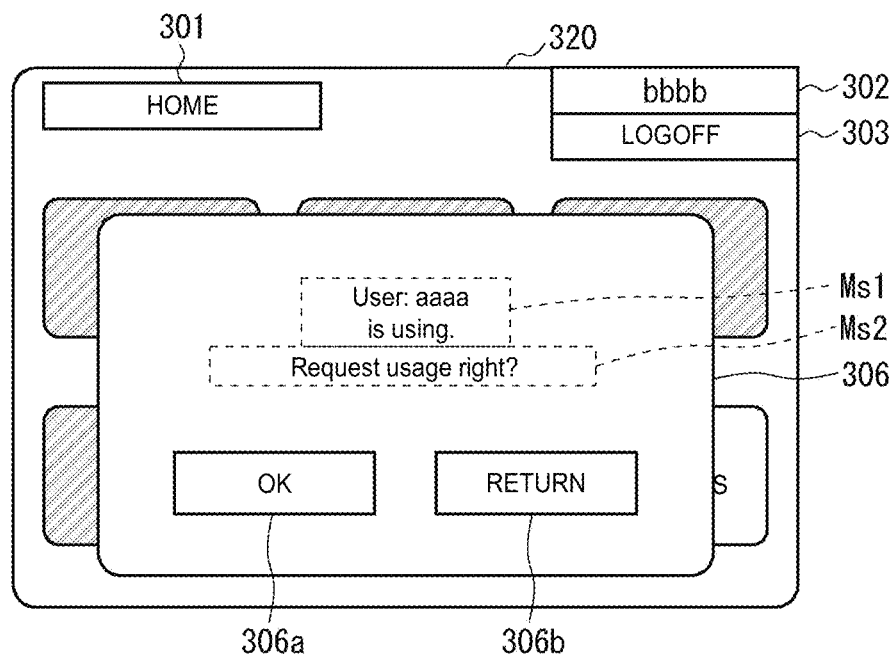
FIGS. 12A and 12B are diagrams illustrating display contents on screens after the usage right is transferred according to a first embodiment.
Figure 12B:
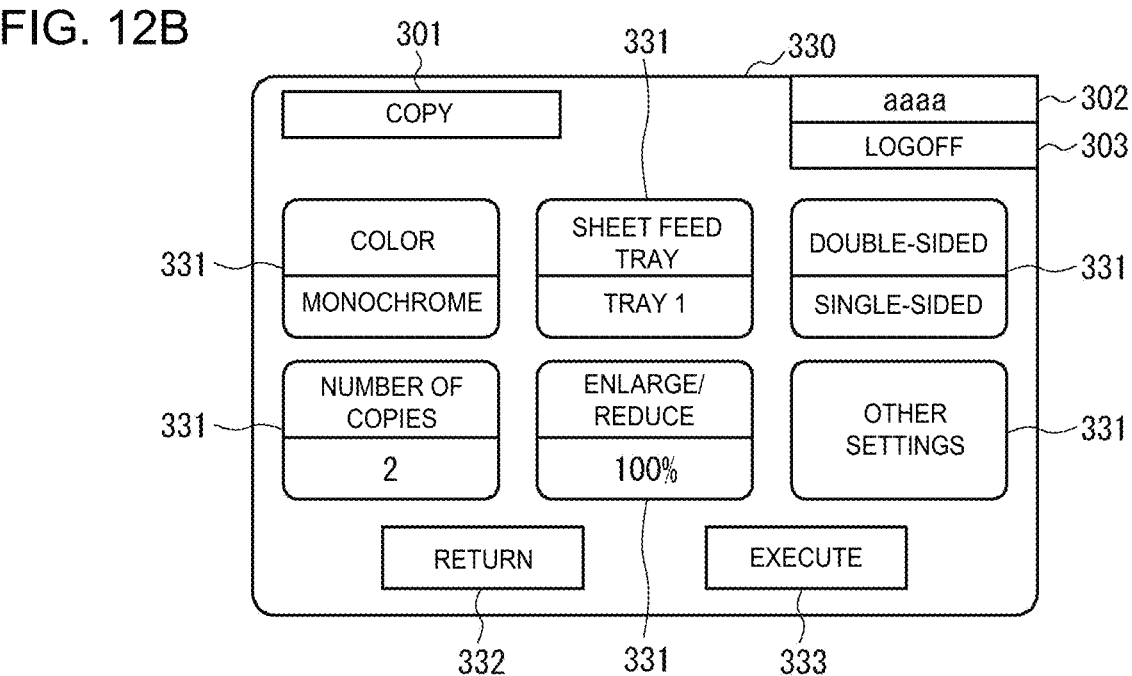

As a result, the operation screen displayed on the requesting-side operation section (the terminal device 200) is switched from the requesting-side operation screen 320 illustrated in FIG. 11B to a copy menu screen 330 illustrated in FIG. 12B. Thus, the requesting-side operation section (the terminal device 200) is enabled to use the duplication function.

Meanwhile, after the usage rights of the duplication function, the image reading function, the printing function, and the facsimile function are transferred from the holding-side operation section (the UI section 170) to the requesting-side operation section (the terminal device 200), the operation screen displayed on the holding-side operation section (the UI section 170) is forcibly returned from the holding-side operation screen (that is, the copy menu screen) 330 to the home menu screen 320. Since the usage rights of the duplication function, the image reading function, the printing function, and the facsimile function are transferred to the requesting-side operation section at this moment, the home menu screen 320 displayed on the holding-side operation section displays the "copy", "scan", "print", and "fax" unavailable buttons 304 instead of the "copy", "scan", "print", and "fax" function buttons 321 and disables the duplication function, the image reading function, the printing function, and the facsimile function from being used.

Here, if the user "bbbb" presses the "copy" unavailable button 304, the dialog box 306 for requesting the usage right from the operation section (the terminal device 200 operated by the user "aaaa"), to which the usage right of the duplication function has been transferred, is displayed on the home menu screen 320 as illustrated in FIG. 12A. After that, the usage rights can be transferred (returned) from the requesting-side operation section to the holding-side operation section in the same procedure as in the above-described transfer of the usage rights from the holding-side operation section (the UI section 170) to the requesting-side operation section (the terminal device 200).

On the other hand, if the user "bbbb" operating the holding-side operation section (the UI section 170) presses the reject button 305*b* in the dialog box 305 illustrated in FIG. 11A, the usage right is not transferred from the holding-side operation section (the UI section 170) to the requesting-side operation section (the terminal device 200) and the holding-side operation section continuously holds the usage right. In this case, on the requesting-side operation section (the terminal device 200), the requesting-side operation screen 320 illustrated in FIG. 10 is continuously displayed and continuously disables the duplication function, the image reading function, the printing function, and the facsimile function from being used.

Moreover, in the exclusive control by the information processing apparatus 100, when a predetermined time passes with none of the permit button 305*a* and the reject button 305*b* pressed after the dialog box 305 is displayed on the holding-side operation section (the UI section 170) as illustrated in FIG. 11A, the usage right is forcibly transferred from the holding-side operation section to the requesting-side operation section. Thus, the usage right can be transferred to the requesting-side operation section even when the operator (the user "bbbb") of the holding-side operation section (the UI section 170) does not make any response like a case where the operator of the holding-side operation section moves away from the holding-side operation section while the holding-side operation screen 330 is being displayed. This makes it possible to avoid a situation where the operator (the user "aaaa") of the requesting-side operation section (the terminal device 200) has to unnecessarily waits. In this case, the operation screen on the holding-side operation section (the UI section 170) is forcibly returned to the home menu screen 320.

Meanwhile, in the exclusive control, even when the predetermined time passes with none of the permit button 305*a* and the reject button 305*b* pressed after the dialog box 305 is displayed on the holding-side operation section (the UI section 170), the usage right is not forcibly transfer from the holding-side operation section to the requesting-side operation section in a case where the consumables replacement work is underway in the information processing apparatus 100. The consumables replacement is described in detail later.

Further, in the exclusive control by the information processing apparatus 100, for example, when the operator (the user "bbbb") on the holding-side operation section (the UI section 170) side presses the return button 332 on the copy menu screen 330 to return the operation screen to the home menu screen 320 or logs off by pressing the logoff button 303 on the copy menu screen 330, the held usage rights of the duplication function, the image reading function, the printing function, and the facsimile function are released. In the case where the usage rights are transferred to the requesting-side operation section, the usage rights are released in the same procedure.

In this case, the usage right information manager 185 of the information processing apparatus 100 deletes the usage right information specifying the operation section holding the usage right of the duplication function and the usage rights of the image reading function, the printing function, and the facsimile function. Thus, the usage rights of the duplication function, the image reading function, the printing function, and the facsimile function are released.

Moreover, when a predetermined time passes in a state where the requesting-side operation section (the terminal device 200) leaves the duplication function unattended without making any response after the usage right of the duplication function is transferred from the holding-side operation section (the UI section 170) to the requesting-side operation section, the usage rights of the duplication function and others may be forcibly returned to the holding-side operation section, for example.

Furthermore, for example, when a predetermined time passes in a state where the holding-side operation section (the UI section 170) leaves the duplication function unattended without making any response after the holding-side operation section rejects the usage right request of the duplication function from the requesting-side operation section (the terminal device 200), the usage right of the duplication function may be forcibly transferred to the requesting-side operation section.

This makes it possible to avoid a situation where the operator of the holding-side operation section or the operator of the requesting-side operation section has to unnecessarily wait. The exclusive control by the information processing apparatus 100 is as described above.

(1-7-4. Consumables Replacement)

Next, as an operation of the information processing apparatus 100, consumables replacement is described in detail. In the information processing apparatus 100, during execution of the duplication function in response to an operation by the holding-side operation section (the UI section 170 or the terminal device 200), there is a case where the recording sheets 14 in the sheet tray 11 run out, the toners of the image formation units 25 run out, or the photoreceptor drums 30 need to be replaced, or the like. In this case, consumables such as the recording sheets 14, the toners, or the photoreceptor drums 30 need to be replaced in the information processing apparatus 100. The consumables replacement mentioned herein includes consumables replenishment.

In this case, the operator (user) of the holding-side operation section, for example, moves from the installation location of the information processing apparatus 100 to a consumables storage location to pick up the consumables, again returns to the installation location of the information processing apparatus 100, and then performs the consumables replacement work. During this work, the operator (user) is disabled from operating the holding-side operation section until the consumables replacement work is completed. For this reason, even if the requesting-side operation section requests the usage right of the duplication function, for example, the operator cannot respond to it.

To address this, as described above, during the consumables replacement work, the information processing apparatus 100 prohibits the usage right from being transferred to the requesting-side operation section even when the holding-side operation section leaves the concerned function unattended without making any response for the predetermined time.

Figure 13A:
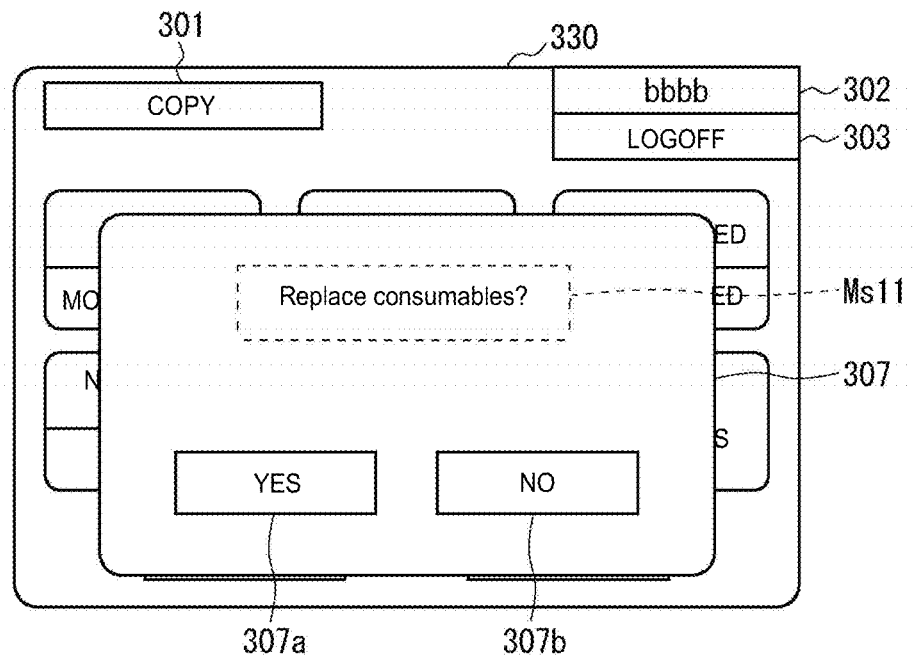
FIGS. 13A and 13B are diagrams illustrating display contents of screens for performing consumable replacement work according to a first embodiment.

Specifically, for example, when consumables replacement becomes necessary while the user "bbbb" is using the duplication function by operating the UI section 170, the exclusive control executor 184 of the information processing apparatus 100 causes a dialog box 307 for making a response about the consumables replacement to be displayed on the copy menu screen 330 as illustrated in FIG. 13A. Here, for example, when receiving a notification that consumables replacement is needed from the consumables manager 187, the exclusive control executor 184 instructs the display controller 181 to display the dialog box 307.

In this dialog box 307, a message ("Replace consumables?") Ms11 asking whether or not to replace consumables, a "YES" button 307*a* for choosing to replace the consumables, and a "NO" button 307*b* for choosing not to replace the consumables are displayed.

Figure 13B:
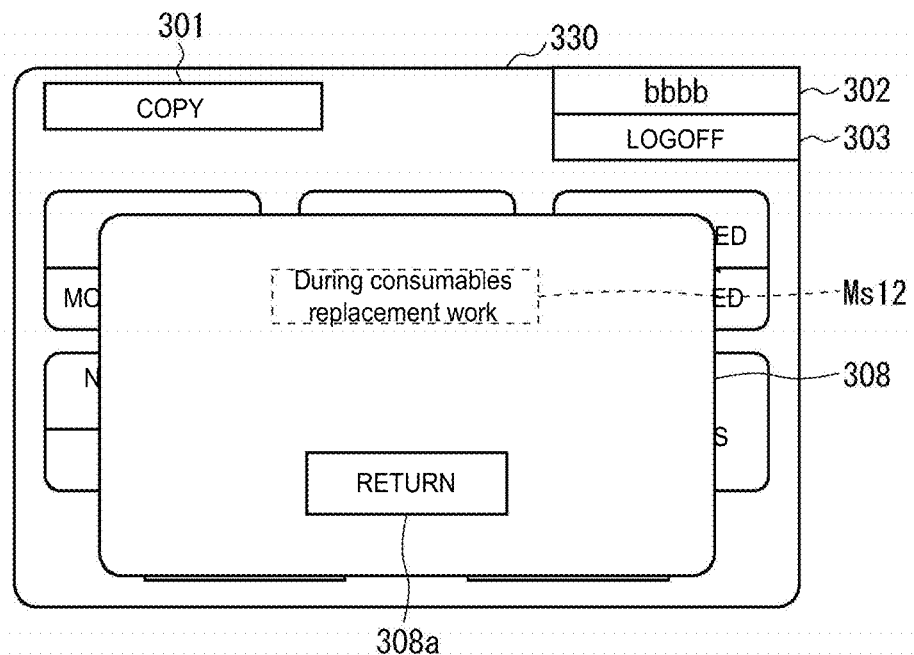

When the user "bbbb" presses the "YES" button 307*a*, a dialog box 308 illustrated in FIG. 13B is displayed in place of the dialog box 307. In this dialog box 308, a massage ("During consumable replacement work") Ms12 indicating that the consumables replacement work is underway and a return button 308*a* for choosing to return from the consumables replacement work are displayed.

The exclusive control executor 184 causes the dialog box 308 to be continuously displayed until the return button 308*a* in the dialog box 308 is pressed or until notifications that the consumables replacement work is completed are received from both of the consumables manager 187 and the apparatus-status manager 188. While the dialog box 308 is being displayed, the exclusive control executor 184 prohibits the usage right from being transferred to the requesting-side operation section even when the holding-side operation section does not make any response for the predetermined time.

However, if the exclusive control executor 184 waits unlimitedly until the return button 308*a* in the dialog box 308 is pressed or until the notifications that the consumables replacement work is completed are received from both of the consumables manager 187 and the apparatus-status manager 188, the operator of the requesting-side operation section is kept waiting unnecessarily. To avoid this, for example, a work time required for the consumables replacement work (a time longer than the predetermined time) may be set and the status where the usage right is prohibited from being transferred to the requesting-side operation section may be cancelled when the set work time passes while the return button 308*a* is not pressed or while the notifications that the consumables replacement work is completed are not received from both of the consumables manager 187 and the apparatus-status manager 188. Here, the work time may be input by a user who is going to perform consumables replacement work before performing the consumables replacement work, or be set to a predetermined work time (for example, five minutes) in advance.

When the "NO" button 307*b* for choosing not to replace the consumables is pressed, the usage right held by the holding-side operation section may be transferred to the requesting-side operation section. Then, when there is no requesting-side operation section, the usage right held by the holding-side operation section may be released. The consumables replacement in the information processing apparatus 100 is as described above.

(1-8. Transition of Operation Screens)

Figure 14:
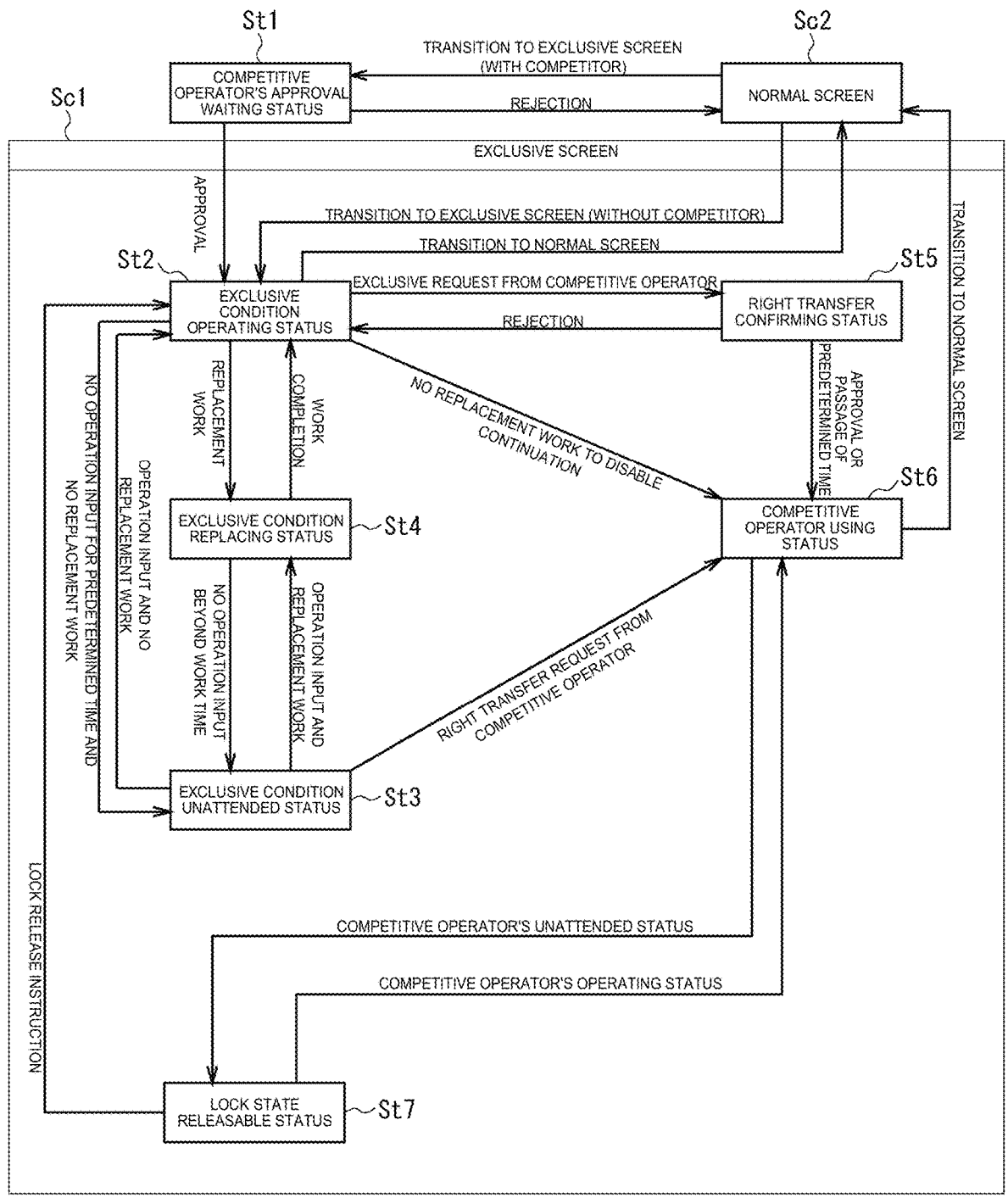
FIG. 14 is a diagram illustrating a transition of screens according to a first embodiment.

Next, FIG. 14 illustrates a transition diagram of operation screens displayed on the UI section 170 of the information processing apparatus 100 and the display section 240 of the terminal device 200. In FIG. 14, a menu screen for a function subject to exclusive control (for example, the copy menu screen 330) is referred to as an exclusive screen Sc1 and a menu screen for a function not subject to exclusive control (for example, the home menu screen 320) is referred to as a normal screen Sc2.

In FIG. 14, an operator who causes (or is about to cause) the same exclusive screen to be displayed is referred to as a competitive operator. Specifically, when seen from one operator who is about to cause the exclusive screen to be displayed by using one operation section, the competitive operator is another operator who already has the exclusive screen displayed by using another operation section. Alternatively, when seen from one operator who already has the exclusive screen displayed by using one operation section, the competitive operator is another operator who is about to cause the exclusive screen to be displayed by using another operation section.

Since the screen transition is described in detail above, brief description is given herein. As illustrated in FIG. 14, when an operator is about to make a transition to the exclusive screen Sc1 from a state where the normal screen Sc2 is displayed, the transition to the exclusive screen Sc1 can be made freely if there is no competitive operator. On the other hand, if there is a competitive operator, the operation section turns to a status St1 where an approval from the competitive operator is waited (a permission is waited). Then, when the competitive operator gives a permission, the transition to the exclusive screen Sc1 can be made; however, when the competitive operator rejects, the transition to the exclusive screen Sc1 cannot be made but the normal screen Sc2 remains. Meanwhile, the transition from the exclusive screen Sc1 to the normal screen Sc2 can be made freely.

Basic statuses of the operation section on which the exclusive screen Sc1 is displayed are an exclusive condition operating status St2 in which the operation section is being operated under an exclusive condition (the condition where the usage right is given to only the operation section), an exclusive condition unattended status St3 in which the operation section is not operated or attended for a predetermined time under the exclusive condition (in other words, an unattended status in which no response is received from the operation section for the predetermined time), and an exclusive condition replacing status St4 in which consumables replacement is performed under the exclusive condition. Here, the exclusive condition operating status St2 includes a status in which the information processing apparatus 100 is operating in response to an operation performed on the operation section. Thus, the exclusive condition unattended status St3 is a status in which the operation section is not operated (in other words, no response is received from the operation section) and in which the function executor 186 is not executing the function in response to an operation performed on the operation section. Specifically, for example, a status from the start to the end of printing executed the function executor 186 in response to an operation performed on the operation section is included in the exclusive condition operating status St2.

In the case where, when the operation section of the operator is in the exclusive condition operating status St2, a competitive operator requests a transition to the exclusive screen Sc1 (in other words, requests the usage right), the status St2 turns to a status St5 in which whether or not to transfer the usage right of the function of the exclusive screen Sc1 is confirmed (see FIG. 11A). Then, when the operator approves (permits) the transfer of the usage right or when the predetermined time passes without receiving an approval or rejection of the transfer, the usage right is transferred to the competitive operator, and the status St5 turns to a competitive operator using status St6 in which the operator is disabled from transitioning to the exclusive screen Sc1. In this case, the operation screen on the operator side is returned to the normal screen Sc2. Here, when there is no competitive operator, the status does not turn to the competitive operator using status St6 and the usage right held by the operator is just released.

When the competitive operator requests a transition to the exclusive screen Sc1 in the exclusive condition unattended status St3, the usage right is transferred to the competitive operator without obtaining a confirmation from the operator and the status St3 turns to the competitive operator using status St6. Then, when the competitive operator does not perform any operation for the predetermined time in the competitive operator using status St6, the status St6 turns to a status St7 in which a lock state where a transition to the exclusive screen Sc1 is disabled is releasable. Here, if the operator has requested a transition to the exclusive screen Sc1, the status St7 turns to the exclusive condition operating status St2.

In a case where the operator performs consumables replacement when the consumables replacement becomes necessary in the exclusive condition operating status St2, the status St2 turns to the exclusive condition replacing status St4 (see FIG. 13B) in which the usage right is not transferred even if the operation section is unattended for the predetermined time. Here, even in the exclusive condition replacing status St4, the operation section is unattended continuously beyond the work time set in advance, the status St4 turns to the exclusive condition unattended status St3. Meanwhile, in a case where the operator does not perform the consumables replacement despite the necessity of the consumables replacement in the exclusive condition operating status St2, the status St2 turns to the competitive operator using status St6. In this case, the operation screen on the operator side is returned to the normal screen Sc2. Also in this case, when there is no competitive operator, the status St2 does not turn to the competitive operator using status St6 and the usage right held by the operator is just released.

A conceivable case where the operator does not perform the consumables replacement despite the necessity of the consumables replacement is, for example, a case where, while the operator is using the duplication function, the toners run out and need to be replaced but the operator cannot replace the toners because the operator does not know how to replace the toners, or the like. In such a case, the duplication function is not usable in the information processing apparatus 100 as a matter of course. In this case, if there is a competitive operator, the status St2 turns to the competitive operator using status St6, which causes the usage right to be transferred to the competitive operator. In this case, the competitive operator performs the consumables replacement instead of the operator. The transition of the operation screens is as described above.

(1-9. Summary and Effects)

As described above, in a first embodiment, the information processing apparatus 100 includes: the authentication processor 183 that performs a login authentication based on an operation performed on the UI section 170 serving as the operation section; the exclusive control executor 184 that gives the usage right of a function to the UI section 170 after the UI section 170 is authenticated by the login authentication, and releases the usage right given to the UI section 170 when the UI section 170 does not make any response for a predetermined time (in other words, the UI section 170 is not operated and the function executor 186 is not executing the function) after the usage right is given; the function executor 186 that executes a function based on an operation performed on the UI section 170 when the usage right of the function is given to the UI section 170; and the consumables manager 187 and the apparatus-status manager 188 that act as a status detector for detecting a status of the information processing apparatus 100 as the apparatus to be served.

The exclusive control executor 184 determines whether or not to release the usage right given to the UI section 170 based on the detection result by the consumables manager 187 and the apparatus-status manager 188. Specifically, when the consumables manager 187 and the apparatus-status manager 188 detect that the status of the information processing apparatus 100 is the predetermined status (more specifically, the status where consumables replacement is needed) and predetermined work (more specifically, consumables replacement work) for the predetermined status is being performed, the exclusive control executor 184 does not release the usage right given to the UI section 170 even after the predetermined time passes.

In short, the exclusive control executor 184 of the information processing apparatus 100 does not release the usage right given to the UI section 170 while the consumables manager 187 and the apparatus-status manager 188 are detecting that the status of the information processing apparatus 100 is the status where the consumables replacement is needed.

In this way, the information processing apparatus 100 is capable of avoiding a situation where the usage right of a function used by a user is released while the user is performing the consumables replacement work, and allowing the user to automatically continue using the used function after completion of the consumables replacement work. Thus, the information processing apparatus 100 in a first embodiment makes it possible to improve the work efficiency as compared to the related art.

In addition, the information processing apparatus 100 is capable of being operated by multiple operation sections (for example, the UI section 170 and the terminal device 200), and the exclusive control executor 184 gives the usage right of a function to one operation section (for example, the UI section 170) and transfers the usage right given to the one operation section to another operation section (for example, the terminal device 200) when the one operation section does not make any response for a predetermined time after the usage right is given.

Then, when the consumables manager 187 detects that the status of the information processing apparatus 100 is the status where consumables replacement is needed, the exclusive control executor 184 releases the usage right given to the UI section 170 if the user chooses not to perform the consumables replacement work by operating the UI section 170.

In this way, for example, in the case where the user operating the UI section 170 is not capable of replacing the consumables or other cases, the usage right given to the UI section 170 is released and transferred to the terminal device 200, so that a user operating the terminal device 200 can instead perform the consumables replacement work.

Moreover, in the state where the consumables manager 187 and the apparatus-status manager 188 detect that the status of the information processing apparatus 100 is the status where the consumables replacement is needed, the exclusive control executor 184 releases the usage right given to the UI section 170 in a case where the consumables manager 187 and the apparatus-status manager 188 do not detect that the information processing apparatus 100 is in the status where the consumables replacement work is completed even after the work time set in advance passes.

Thus, for example, in a case where the user operating the UI section 170 quits the consumables replacement work in the middle or the like, the usage right given to the UI section 170 is released and transferred to the terminal device 200, so that the user operating the terminal device 200 can instead perform the consumables replacement work.

2. Second Embodiment

Next, a second embodiment is described, which is an embodiment different from a first embodiment described above in part of the exclusive control by the exclusive control executor 184 of the information processing apparatus 100. Therefore, the part different from a first embodiment described above is mainly described herein and the description of the same part as a first embodiment described above is omitted as appropriate.

A second embodiment has the same configurations as the configurations in FIGS. 1 to 6 described as a first embodiment. In a second embodiment, the same operations as the operations in FIGS. 7 to 12 described as a first embodiment are performed. On the other hand, a second embodiment is different from a first embodiment in exclusive control during consumables replacement in the information processing apparatus 100.

(2-1. Exclusive Control During Consumables Replacement)

In a first embodiment described above, the usage right of a function is not transferred to the requesting-side operation section while the consumables replacement work in the information processing apparatus 100 is being performed. In a second embodiment, the usage right of a function usable even during the consumables replacement work is transferred to the requesting-side operation section temporarily only during the consumables replacement work.

In a specific example, while the duplication function of the information processing apparatus 100 is being used, there is a case where, for example, toners run out and toner replacement work is performed. In this case, the image reading (scan) function is usable even during the toner replacement work because the image reading function does not use the toners. For this reason, when a function whose usage right is requested by a requesting-side operation section is the image reading function, the usage right of the image reading function is temporarily transferred to the requesting-side operation section. This enables an operator of the requesting-side operation section to use the image reading function without waiting until the toner replacement work is completed and the use of the duplication function by the holding-side operation section is finished.

Figure 15A:
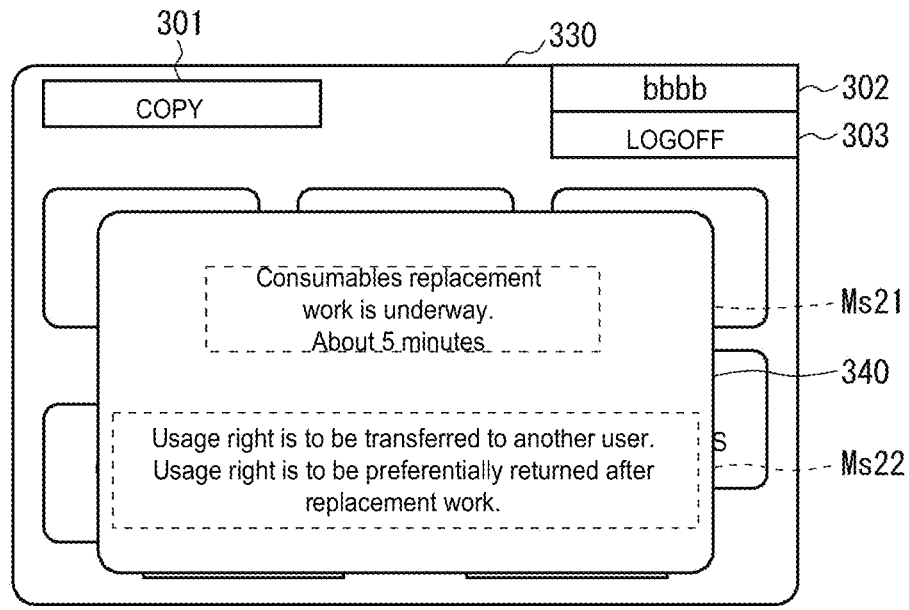
FIGS. 15A and 15B are diagrams illustrating display contents of screens for performing consumable replacement work according to a second embodiment.

In this case, for example, on the holding-side operation section (for example, the UI section 170) being operated by the user "bbbb", when the operator (the user "bbbb") presses the "YES" button 307a in the dialog box 307 illustrated in FIG. 13A in order to choose to perform the consumables replacement work, the dialog box 307 is switched to a dialog box 340 as illustrated in FIG. 15A.

In this dialog box 340, a message ("Consumables replacement work is underway", "About 5 minutes") Ms21 indicating that the consumables replacement work is underway and the work time and a message ("Usage right is to be transferred to another user", "Usage right is to be preferentially returned after replacement work") Ms 22 indicating that the usage right is to be transferred to another operation section, and that usage right is to be preferentially returned after the consumable replacement work is completed are displayed. Here, the work time may be input by a user who is going to perform the consumables replacement work before performing the consumables replacement work, or be set to a predetermined work time (for example, five minutes) in advance. This work time may be set to a time required for the previous consumables replacement work, or may be set to an average time required for the consumables replacement work so far.

At this moment, the usage right information manager 185 updates the usage right information such that the usage right of the image reading function usable during the consumables replacement work is released from the holding-side operation section. Thus, the usage right of the image reading function is released from the holding-side operation section.

On the other hand, at this moment, for example, on the requesting-side operation section (for example, the terminal device 200) being operated by the user "aaaa", the "scan" unavailable button 304 among the function unavailable buttons 304 displayed on the home menu screen 320 is switched to the "scan" function button 321 and thereby the user "aaaa" can be aware that the image reading function is now available.

Figure 15B:
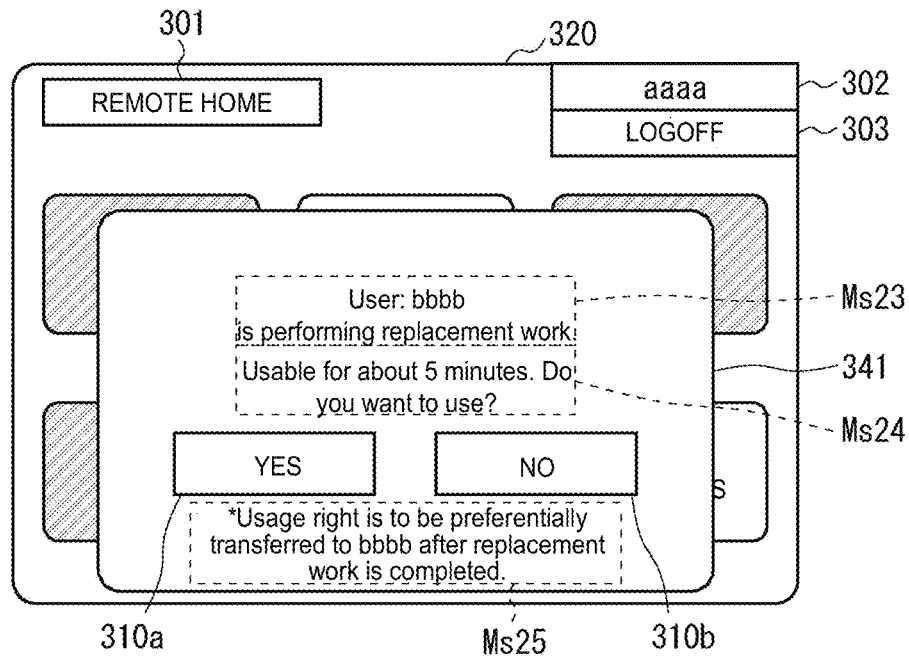

Here, when the user "aaaa" presses the "scan" function button 321, a dialog box 341 is displayed on the home menu screen 320 as illustrated in FIG. 15B.

In this dialog box 341, a message ("User: bbbb is performing replacement work") Ms23 indicating that the consumables replacement work is underway, a message ("Usable for about 5 minutes", "Do you want to use?") Ms 24 indicating that a designated function (the image reading function in this case) is available for a predetermined time, and asking whether or not to use this function, a "YES" button 310a for choosing to use, a "NO" button 310b for choosing not to use, and a message ("Usage right is to be preferentially transferred to bbbb after replacement work is completed") Ms 25 indicating that the usage right is to be returned after the replacement work is completed are displayed.

Here, if the user "aaaa" presses the "YES" button 310a, the operation screen is switched to a scan menu screen not illustrated. In addition, the usage right information manager 185 creates usage right information indicating that the usage right of the image reading function is given to the requesting-side operation section. Thus, the usage right of the image reading function is given to the requesting-side operation section. After that, when the consumables replacement work is completed, the usage right of the image reading function is transferred from the requesting-side operation section to the holding-side operation section.

(2-2. Transition of Operation Screens)

Figure 16:
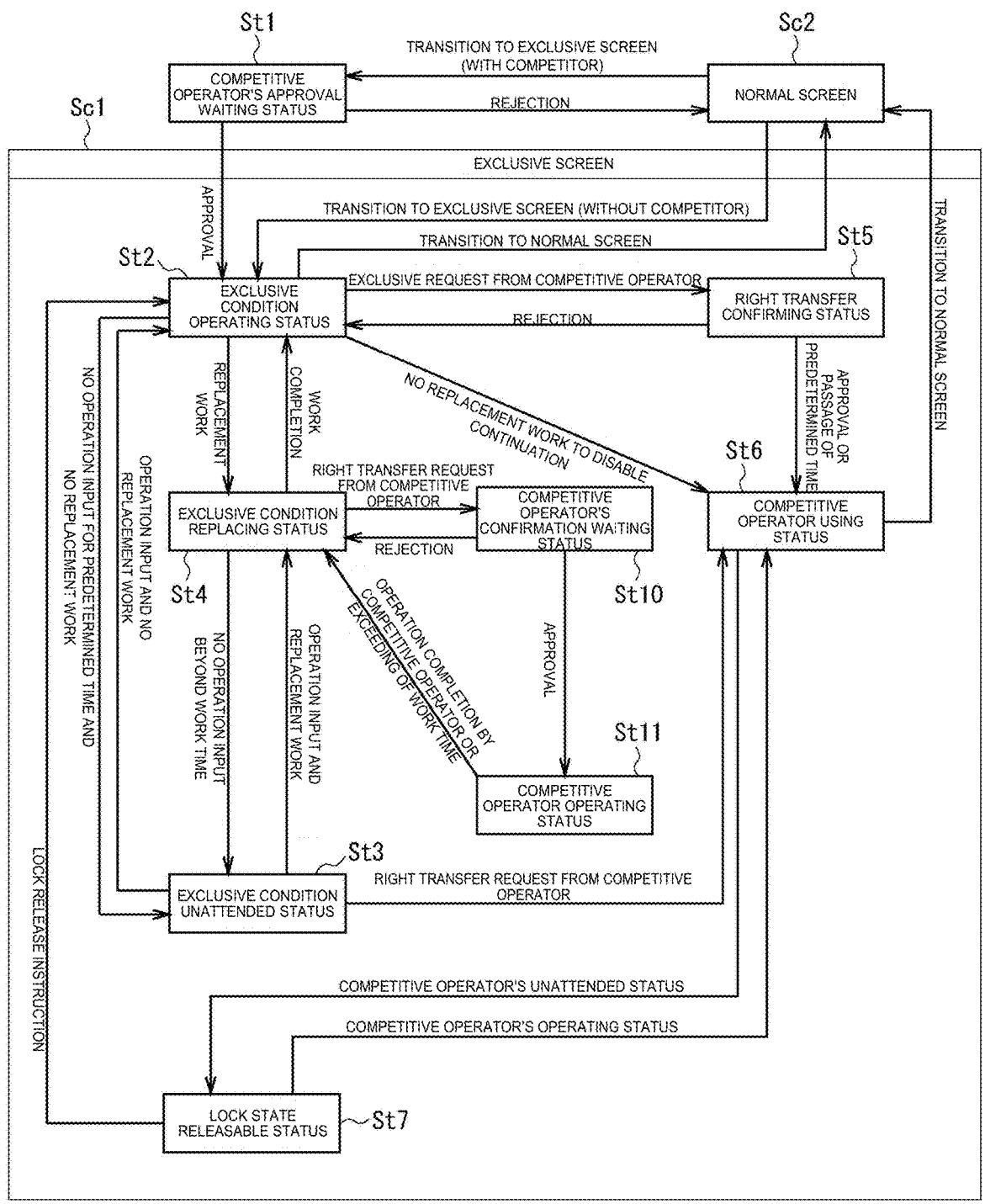
FIG. 16 is a diagram illustrating a transition of screens according to a second embodiment.

Next, FIG. 16 illustrates a transition diagram of operation screens according to a second embodiment. FIG. 16 is the same as FIG. 14 except for some portions. Therefore, only the portions different from those in the transition diagram illustrated in FIG. 14 are described.

The transition diagram illustrated in FIG. 16 is different from the transition diagram in FIG. 14 in the portions in which the exclusive condition replacing status St4 is transitioned to a competitive operator's confirmation waiting status St10 which is then transitioned to a competitive operator operating status St11.

Specifically, on the exclusive screen Sc1, when a competitive operator requests the usage right of a function usable during the consumables replacement work in the exclusive condition replacing status St4 in which the consumables replacement work is being performed, the status St4 turns to the competitive operator's confirmation waiting status St10, in which the competitive operator is asked to confirm whether or not to use the function only during the consumables replacement work (see FIG. 15B). When the competitive operator chooses to use the function only during the consumables replacement work, the status St10 turns to the competitive operator operating status St11 and the competitive operator uses the function on the exclusive screen Sc1. Then, when the operation by the competitive operator is completed (the use of the function is completed) before the work time of the consumables replacement work passes, or when the work time passes, the status St11 turns to the exclusive condition replacing status St4 again and the usage right transferred to the competitive operator is returned to the operator. The transition of the operation screens is as described above.

(2-3. Summary and Effects)

As described above, in a second embodiment, while the consumables replacement work in the information processing apparatus 100 is performed on the holding-side operation section (for example, the UI section 170) side, the exclusive control executor 184 of the information processing apparatus 100 transfers the usage right of a function usable even during the consumables replacement work to the requesting-side operation section (for example, the terminal device 200) temporarily until the consumables replacement work is completed.

This enables the operator operating the requesting-side operation section to use the function without waiting until the consumables replacement work in the information processing apparatus 100 is completed and the use of the function by the holding-side operation section is completed. Thus, according to a second embodiment, it is possible to further improve the work efficiency as compared to a first embodiment described above.

3. Other Embodiments (3-1. Other Embodiment 1)

In a first embodiment described above, when the usage right given to the operation section is released (or transferred), the operation screen on the operation section is returned to the home menu screen 320. However, embodiments are not limited to this. For example, when the operation section is logged off, the usage right given to the operation section may be released (or transferred) and the operation screen on the operation section may be returned to the login screen 310. The same applies to a second embodiment.

Instead, without being limited to the above, when the usage right given to the operation section is released (or transferred), the operation screen of the operation section does not have to be returned to the home menu screen 320 but the function menu screen such as the copy menu screen 330 may remain continuously displayed. In this case, since the usage right is released, an operation on the function menu screen (in other words, the use of the function) just has to be disabled. The same applies to a second embodiment.

In a first embodiment described above, while one operator operating the information processing apparatus 100 by using one operation section (one operator logging in the information processing apparatus 100) is engaged in the consumables replacement work in the information processing apparatus 100, the usage right is not transferred to another operation section. Here, for example, in a case where there is not any other operation section, or more specifically where only the one operator logs in the information processing apparatus 100, the usage right given to the one operation section may not be released or the one operator may be kept from logging off while the one operator is engaged in the consumables replacement work in the information processing apparatus 100. The same applies to a second embodiment.

(3-2. Other Embodiments 2)

Further, in a first embodiment described above, while one operator operating the information processing apparatus 100 by using one operation section is engaged in the consumables replacement work in the information processing apparatus 100, the usage right is not transferred to another operation section. Embodiments are not limited to this. For example, also while one operator is engaged in work for resolving an error that occurs in the information processing apparatus 100 (for example, a paper jam), the usage right may not be transferred to another operation section.

In this case, for example, each of the image formation section 110, the image reading section 120, and the sheet transport section 130 in the information processing apparatus 100 may have a function to detect an error occurring therein, and notify the apparatus-status manager 188 of the detected error. The apparatus-status manager 188 may determine whether or not the information processing apparatus 100 is in a status during error resolving work based on the notified error, opening and closing of the sheet tray 11, opening and closing of the cover 50, and the like, and notify the exclusive control executor 184 of the determination result.

In this way, it is possible to avoid a situation where the usage right of a function used by a user is released while the user is engaged in the error resolving work, and allow the user to automatically continue using the used function after the error resolving work is completed.

Moreover, it may be also detected that work other than the consumables replacement work or the error resolving work (that is, work that is performed separately from an operation that uses the function) is being performed and the usage right given to the one operation section may not be released while that work is being performed.

Moreover, the apparatus-status manager 188 of the information processing apparatus 100 determines that such work is being performed based on opening and closing of the sheet tray 11 and opening and closing of the cover 50, but embodiments are not limited to this. For example, the information processing apparatus 100 may be provided with a human detecting sensor and the apparatus-status manager 188 may determine that an operator is engaged in certain work on the information processing apparatus 100 without using the operation section when the human detecting sensor detects the operator near the information processing apparatus 100 even though no response is received from the operation section.

(3-3. Other Embodiment 3)

In a first embodiment described above, the user information database 300 and the authentication information database 400 are provided separately from the information processing apparatus 100, but these databases may be built in the storage section 190 of the information processing apparatus 100.

(3-4. Other Embodiment 4)

In each of one or more embodiments described above, the invention is applied to the information processing apparatus 100 that allows multiple operators to log in at the same time. However, embodiments are not limited to this. For example, the invention may be applied to an information processing apparatus that limitedly allows only one operator to log in at one time. In this case, control may be performed such that the login operator is kept from logging off while the operator is engaged in work such as consumables replacement work.

Further, in each of one or more embodiments described above, the invention is applied to the information processing apparatus 100 configured as the multi-function machine. However, embodiments are not limited to this and the invention may be applied to various information processing apparatuses each of which allows operators to use various functions after the operators log into the information processing apparatus.

(3-5 Other Embodiment 5)

Moreover, the invention should not be limited to one or more embodiments described above. The application range of the invention covers embodiments each composed of a certain combination of some or all parts of one or more embodiments described above and embodiments each composed of some parts extracted from one or more embodiments described above.

The invention may be widely used in, for example, image formation apparatuses each including a fixing unit.

The invention includes other embodiments in addition to one or more embodiments described above without departing from the spirit of the invention. One or more embodiments described above are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. An information processing apparatus comprising: one or more processors configured with a program to perform operations comprising:

operation as an authentication processor configured to perform a login authentication based on an operation performed on an operation section;

operation as an exclusive control executor configured to give a usage right to use a function to the operation section after the operation section is authenticated by the login authentication and release the usage right given to the operation section in a case in which no response is received from the operation section for a predetermined time after the usage right is given;

operation as a function executor configured to execute the function based on an operation performed on the operation section when the usage right of the function is given to the operation section; and operation as a status detector configured to detect a status of the information processing apparatus, wherein operation as the exclusive control executor is further configured to determine, based on a detection result by the status detector, whether or not to release the usage right given to the operation section after the predetermined time passes, operation as the status detector is further configured to detect a predetermined status of the information processing apparatus, and in a time period when operation as the status detector is detecting predetermined work for the predetermined status, operation as the exclusive control executor is further configured to not release the usage right given to the operation section even if the predetermined time passes with no response received from the operation section.

2. The information processing apparatus according to claim 1, wherein operation as the exclusive control executor is further configured to release the usage right given to the operation section in a case in which the status detector does not detect completion of the work even a work time set to be a time longer than the predetermined time passes in a state where the status detector detects the predetermined status.

3. The information processing apparatus according to claim 1, wherein
operation as the exclusive control executor is further configured, if the operation section receives an operation of choosing not to perform the predetermined work for the predetermined status when the status detector detects the predetermined status, to release the usage right given to the operation section.

4. The information processing apparatus according to claim 1, wherein
the predetermined status comprises a status in which consumables replacement is needed.

5. The information processing apparatus according to claim 4, wherein
the predetermined work comprises consumables replacement work.

6. The information processing apparatus according to claim 1, wherein
the case in which no response is received from the operation section comprises a case in which the operation section is not operated and the function executor is not executing the function.

7. The information processing apparatus according to claim 1, wherein
the information processing apparatus is operable by a plurality of operation sections authenticated by the login authentication,
in a case in which no response is received from one operation section of the plurality of operation sections for a predetermined time after the usage right to use a function is given to the one operation section, operation as the exclusive control executor is further configured to transfer the usage right given to the one operation section to another operation section of the plurality of operation sections, and
in a time period when operation as the status detector is detecting the predetermined status, operation as the exclusive control executor is further configured to not transfer the usage right given to the one operation section to the another operation section even when the predetermined time passes with no response received from the one operation section.

8. The information processing apparatus according to claim 7, wherein
in a case in which the function whose usage right is given to the one operation section is a function usable even during the predetermined work, operation as the exclusive control executor is further configured to transfer the usage right given to the one operation section to the another operation section in the time period when operation as the status detector is detecting the predetermined status.

9. The information processing apparatus according to claim 8, wherein
operation as the exclusive control executor is further configured to return the usage right given to the another operation section to the one operation section when the status detector detects that the work is completed.

10. An information processing method to be performed by an information processing apparatus, comprising:
performing a login authentication based on an operation performed on an operation section;
giving a usage right to use a function to the operation section after the operation section is authenticated by the login authentication and releasing the usage right given to the operation section in a case in which no response is received from the operation section for a predetermined time after the usage right is given to determine, based on a detection result by detecting a status of the information processing apparatus, whether or not to release the usage right given to the operation section after the predetermined time passes; and
in a time period when predetermined work in a predetermined status is detected, the usage right given to the operation section is not released even if the predetermined time passes with no response received from the operation section.

* * * * *